United States Patent [19]

Yamauchi et al.

[11] Patent Number: 5,701,497
[45] Date of Patent: Dec. 23, 1997

[54] TELECOMMUNICATION APPARATUS HAVING A CAPABILITY OF TRANSLATION

[75] Inventors: Satoshi Yamauchi, Yokohama; Hiroshi Tamura, Sagamihara; Takashi Katooka; Naoki Tsumura, both of Yokohama; Naoto Hikichi, Chofu; Chihiro Narumi, Ebina; Takashi Ezaki, Yokohama; Shozo Kudo, Yokohama; Yoshihisa Ooguro, Yokohama, all of Japan

[73] Assignee: Ricoh Company, Ltd., Tokyo, Japan

[21] Appl. No.: 330,073

[22] Filed: Oct. 26, 1994

[30] Foreign Application Priority Data

Oct. 27, 1993 [JP] Japan .................. 5-269288
Dec. 28, 1993 [JP] Japan .................. 5-334479

[51] Int. Cl.$^6$ .................................................. G06F 15/38
[52] U.S. Cl. ...................... 395/753; 358/403; 379/100; 395/840; 395/285

[58] Field of Search ............... 364/419.01–419.04; 379/90, 100, 402; 358/400, 403; 382/2; 395/840, 285, 753

[56] References Cited

U.S. PATENT DOCUMENTS

| | | | |
|---|---|---|---|
| 4,996,707 | 2/1991 | O'Malley | 379/100 |
| 5,077,804 | 12/1991 | Richard | 382/7 |
| 5,175,684 | 12/1992 | Chong | 364/419 |
| 5,287,199 | 2/1994 | Zoccolillo | 358/402 |

*Primary Examiner*—Jeffery Hofsass
*Assistant Examiner*—Albert K. Wong
*Attorney, Agent, or Firm*—Oblon, Spivak, McClelland, Maier & Neustadt, P.C.

[57] ABSTRACT

A telecommunication apparatus includes a translation unit for translating a received document from a source language to a target language and discriminates the source language based upon a protocol message transmitted from a remote terminal for setting up a connection.

21 Claims, 28 Drawing Sheets

FIG.8

| 1st~2nd BITE | COMMAND ( S_CAP OR R_CAP ) |
|---|---|
| 3rd AND MORE BYTES | PLAIN TEXT SUPPORT ( 1 bit )<br>A FORMAT SUPPORT ( 1 bit )<br>B FORMAT SUPPORT ( 1 bit )<br>C FORMAT SUPPORT ( 1 bit )<br>D FORMAT SUPPORT ( 1 bit )<br>.<br>.<br>.<br>ENGLISH PLAIN TXT<br>FRENCH PLAIN TXT<br>GERMAN PLAIN TXT<br>.<br>.<br>.<br>ENGLISH IMAGE DATA<br>FRENCH IMAGE DATA<br>GERMAN IMAGE DATA<br>.<br>.<br>. |

FIG.10

| USER | FILE BOX | FAX/PERSONAL ADDRESS | STATUS | DCT LEVEL (RX) | DCT LEVEL (TX) | DCT USED | DCT SENT |
|---|---|---|---|---|---|---|---|
| SCAN Inc. | */scan | -1-512-321-5672 | 0 | – | – | – | – |
| 伊藤 隆 Takashi Itoh | */scan | */takashi | 0 | 5 | 5 | – | – |
| Neil Day | */scan | */neil | 0 | – | – | – | – |
| Lee Joy | */scan | */lee | 0 | – | – | – | – |
| Tamami Davidson | */scan | */tamami | 0 | – | – | – | 5 |
| Hideo Uebara | */hideo | +81-3-3320-1238 | 0 | – | 2 | – | – |
| Phyllis Anvyl | */phyllis | +1-800-525-1234 | 0 | – | – | – | – |
| UIA Inc. | */uia | +44-1-831-1239 | 0 | – | – | – | – |
| Maru-batu Corp. | */marubatu | +81-3-3210-1230 | | – | 4 | – | – |

FIG.11

| USER | FILE BOX | FAX/PERSONAL ADDRESS | STATUS | DCT LEVEL (RX) | DCT LEVEL (TX) | DCT USED | DCT SENT |
|---|---|---|---|---|---|---|---|
| SCAN Inc. | */scan | -1-512-321-5672 | 1 | - | - | - | - |
| 伊藤 隆<br>Takashi Itoh | */scan | *takashi | 0 | 5 | 5 | - | - |
| Neil Day | */scan | */neil | 0 | - | - | - | - |
| Lee Joy | */scan | */lee | 0 | - | - | - | - |
| Tamami Davidson | */scan | *tamami | 1 | - | - | - | 5 |
| Hideo Uebara | */hideo | +81-3-3320-1238 | 0 | - | 2 | - | - |
| Phyllis Anvyl | */phyllis | +1-800-525-1234 | 0 | - | - | - | - |
| UIA Inc. | */uia | +44-1-831-1239 |  | - | - | - | - |
| Maru-batu Corp. | */marubatu | +81-3-3210-1230 | 1 | - | 4 | - | - |
| Yuka Yamada | */marubatu | */yuka | 1 | - | - | - | - |
| Jiro Suzuki | */marubatu | */jiro | 1 | - | - | - | - |
| Hanako Tanaka | */marubatu | */hanako | 1 | - | - | - | - |

FIG.12

| USER | FILE BOX | FAX/PERSONAL ADDRESS | STATUS | DCT LEVEL (RX) | DCT LEVEL (TX) | DCT USED | DCT SENT |
|---|---|---|---|---|---|---|---|
| 丸X商事 (株)<br>Maru-batu Corp. | */marubatu | -81-3-3210-1230 | 1 | — | — | — | — |
| 山田 由香<br>Yuka Yamada | */marubatu | */yuka | 1 | 1 | 1 | 4 | 4 |
| 鈴木 次郎<br>Jiro Suzuki | */marubatu | */jiro | 1 | 3 | 3 | 2 | 3 |
| 佐藤 太郎<br>Taro Sato | */marubatu | */taro | 0 | 4 | 2 | 1.3 | 3 |
| 田中 花子<br>Hanako Tanaka | */marubatu | */hanako | 1 | 4 | 4 | — | — |
| UIA Inc. | */uia | +44-1-831-1239 | 0 | 3 | — | 1 | — |
| Phyllis Anvyl | */phyllis | +1-800-525-1234 | 0 | 3 | — | — | — |
| SCAN Inc. | */scan | +1-512-321-5672 | 1 | 3 | — | 2 | — |
| Tamami Davidson | */scan | */tamami | 1 | — | — | — | — |
| ARIS GmbH | */aris | +49-711-636-5673 | 0 | 3 | — | 3 | — |
| (株) 甲乙<br>Koh-Otsu Inc. | */koh-otsu | +81-3-3456-1238 | 0 | 2 | 2 | — | 3 |

FIG.13

| SERIAL ID | TYPE | DICTIONARY |
|---|---|---|
| R | — | RECEIVED |
| S | — | TO BE TRANSMITTED |
| 0 | 0 | BASIC |
| 1 | 1 | MECHANICAL |
| 2 | 1 | ELECTRONIC |
| 3 | 1 | COMPUTER |
| 4 | 2 | YUKA YAMADA/PERSONAL |
| 5 | 2 | JIRO SUZUKI/PERSONAL |
| 6 | 2 | TARO SATO/PERSONAL |
| 7 | 2 | HANAKO TANAKA/PERSONAL |

FIG. 14

| ENTRY | LEVEL | PART OF SPEECH | TRANSLATION |
|---|---|---|---|
| am | 0 | 【be】 | |
| an | 0 | 【冠】 | |
| and | 0 | 【接】 | そして；さらに；～と～；そうすれば |
| …… | | | |
| be | 0 | 【be】 | |
| date | 1 | 【名】 | 日付；期日；期間 |
| | | 【動】 | 日付がある；時代遅れになる；日付をいれる；時を推定する；定める；デートをする |
| …… | | | |
| effect | 2 | 【名】 | 結果；効力；影響；印象；意味；動産物件 |
| | | 【動】 | 生じる；果たす |
| enabling | 3 | 【動】 | 可能にする；資格［権利］を与える；許可する |
| …… | | | |
| funds | 1 | 【名】 | 資金；積立会；［a－］（知識などの）貯え；財源 |
| | | 【動】 | 資金を供給する；（交債に）投資する（英） |
| …… | | | |
| it | 0 | 【代】 | |
| inplementation | 1 | 【名】 | 履行；遂行；実施；充足 |
| …… | | | |
| law | 1 | 【名】 | 法（律）；法規；（科学哲学上の）法則 |
| Legislature | 4 | 【名】 | （国の）立法府；州議会（米） |
| …… | | | |
| may | 0 | 【助】 | してもよい；かもしれない；できる |
| …… | | | |
| next | 0 | 【副】 | 次に；隣に；今度 |
| | | 【形】 | 次の；隣の；最も近い |
| | | 【代】 | 次の物［人］ |
| orderly | 2 | 【形】 | 規律正しい；きちんとした；従順な |
| | | 【名】 | 伝令兵（軍）；（病院の）用務員 |
| | | 【副】 | 規則正しく；整然と |
| of | 0 | 【前】 | |
| …… | | | |
| provide | 1 | 【動】 | 供給する；規定する；備える；提供する；準備をする；用意する |
| …… | | | |
| so | 0 | 【副】 | |
| | | 【接】 | |
| …… | | | |
| that | 0 | 【接】 | ～ということ；～ので |
| | | 【代】 | あれ；それ；あの人；前者；～ところの |
| | | 【副】 | それほど；そんなに |
| | | 【形】 | あの；その |
| …… | | | |
| the | 0 | 【冠】 | その；例の |
| …… | | | |
| urged | 3 | 【動】 | 駆り立てる；促す；激励する；主張する；強要する |
| | | 【名】 | 刺激；衝動 |
| …………… | | | |

FIG.15A

| ENTRY | LEVEL | PART OF SPEECH | TRANSLATION |
|---|---|---|---|
| inplementation | 2 | 【名】 | 実施；履行 |
| Legislature | 4 | 【名】 | 州議会 |
| provide | 1 | 【動】 | 提供する；準備する；用意する |

FIG.15B

| ENTRY | LEVEL | PART OF SPEECH | TRANSLATION |
|---|---|---|---|
| Legislature | 4 | 【名】 | 州議会 |
| effect | 2 | 【名】 | 効果；結果；効力；影響；印象；意味；動産物件 |
|  |  | 【動】 | もたらす；生じる；果たす |
| enabling | 3 | 【動】 | 認める；可能にする；資格［権利］を与える；許可する |
| orderly | 2 | 【形】 | きちんとした；規律正しい；従順な |
|  |  | 【名】 | 伝令兵（軍）；（病院の）用務員 |
|  |  | 【副】 | 整然と；規則正しく |
| urged | 3 | 【動】 | 主張する；強要する；駆り立てる；促す；激励する |
|  |  | 【名】 | 衝動；刺激 |

FIG.15C

| ENTRY | LEVEL | PART OF SPEECH | TRANSLATION |
|---|---|---|---|
| Legislature | 4 | 【名】 | 州議会 |

FIG.16

| ENTRY | LEVEL | TYPE | TRANSLATION |
|---|---|---|---|
| HIV | 5 | 【送】 | HIV :Acronym for humann inaenodeficiency virus which causes AIDS |
| Legislature | 5 | 【送】 | state assenbly |

It is urged that the next Legislature provide enabling funds so
　　　駆り立てる　　　　　　　　州議会　　提供する 可能にする 資金
that an orderly implementation of the law may be effected.
　　　　　　　　実施　　　　　　　法（律）　　　　生じる

It is urged that the next Legislature provide enabling funds so
　　　主張する　　　　　　　　　州議会　　　　　　認める
that an orderly implementation of the law may be effected.

It is urged that the next Legislature provide enabling funds so
　　　　　　　　　　　　　　　（国の）立法府
that an orderly implementation of the law may be effected.

FIG.18

[ 35 ]
It is urged that the next Legislature provide enabling funds so that an orderly implementation of the law may be effected.

[ 35 ]
| | | | |
|---|---|---|---|
| urged | 3 | 【動】 | 駆り立てる；促す；激励する；主張する；強要する |
| | | 【名】 | 刺激；衝動 |
| Legislature | 4 | 【名】 | 州議会 |
| provide | 1 | 【動】 | 提供する；準備する；用意する |
| enabling | 3 | 【動】 | 可能にする；資格［権利］を与える；許可する |
| funds | 1 | 【名】 | 資金；積立会；［a—］（知識などの）貯え；財源 |
| | | 【動】 | 資金を供給する；（交債に）投資する（英） |
| orderly | 2 | 【形】 | 規律正しい；きちんとした；従順な |
| | | 【名】 | 伝令兵（軍）；（病院の）用務員 |
| | | 【副】 | 規則正しく；整然と |
| inplementation | 2 | 【名】 | 実施；履行 |
| law | 1 | 【名】 | 法（律）；法規；（科学哲学上の）法則 |
| effect | 2 | 【名】 | 結果；効力；影響；印象；意味；動産物件 |
| | | 【動】 | 生じる；果たす |

[ 35 ]
It is urged that the next Legislature provide enabling funds so that an orderly implementation of the law may be effected.

[ 35 ]

| | | | |
|---|---|---|---|
| urged | 3 | 【動】 | 駆り立てる；促す；激励する；主張する；強要する |
| | | 【名】 | 刺激；衝動 |
| Legislature | | 【送】 | State assenbly |
| provide | 1 | 【動】 | 提供する；準備する；用意する |
| enabling | 3 | 【動】 | 可能にする；資格［権利］を与える；許可する |
| funds | 1 | 【名】 | 資金；積立金；[a—]（知識などの）貯え；財源 |
| | | 【動】 | 資金を供給する；（交債に）投資する（英） |
| orderly | 2 | 【形】 | 規律正しい；きちんとした；従順な |
| | | 【名】 | 伝令兵（軍）；（病院の）用務員 |
| | | 【副】 | 規則正しく；整然と |
| inplementation | 2 | 【名】 | 実施；履行 |
| law | 1 | 【名】 | 法（律）；法規；（科学哲学上の）法則 |
| effect | 2 | 【名】 | 結果；効力；影響；印象；意味；動産物件 |
| | | 【動】 | 生じる；果たす |

[ 36 ]
．．．．．．．．．．．．．．．．．
．．．．．．．．．．．．．．．

[ 47 ]
As long as society respects those who accumulate riches, the deadlier, virus is not HIV, it is greed.

[ 47 ]

| | | | |
|---|---|---|---|
| as long as | 1 | 【前】 | …の間；…のも長い間 |
| | | 【接】 | …する限り；…さえすれば；…であるからには |
| society | 2 | 【名】 | 社会；社交会；交際；（学）会 |
| respect | 2 | 【名】 | 尊敬；敬意；尊重；注意；個所 |
| | | 【動】 | 尊敬［尊重］する；考慮に入れる；自尊心を持つ |
| accumulate | 2 | 【動】 | 蓄積［累算］する |
| riches | 2 | 【名】 | 富；財産；量富 |
| deadly | 2 | 【形】 | 致命的な；執念深い |
| | | 【副】 | 死んだように |
| virus | 3 | 【名】 | ウイルス〈医〉；濾過性病原体；風邪〈口〉； |
| | | | （精神、道徳上の）害毒 |
| HIV | | 【送】 | Acronya for human immunodeficiency virus which causes AIDS |
| greed | 3 | 【名】 | 強欲；貪欲 |

FIG.20

[ 35 ]
It is urged that the next Legislature provide enabling funds so
　　駆り立てる　　　　　　　（国の）立法府　　　　　可能にする
that an orderly implementation of the law may be effected.
　　規律正しく　　　　　　　　　　　　　　　　　　　　生じる

FIG.21

[ 35 ]
It is urged that the next Legislature provide enabling funds so
　　主張する　　　　　　　　州議会　　　　　認める
that an orderly implementation of the law may be effected.

FAX MESSAGE

---

No.93-108　　To : Ms. Yuka Yamada　　From : Tamami Davidson
　　　　　　　Cc : Mr Jiro Suzuki　　　　　　　　with SCAN Inc.
　　　　　　　　　Ms.Hanako Tanaka
　　　　　　　　　With Maru-batu Corp.

1993.11.30

SUBJECT : Introducing a new Computer-Aided Language System for commercial applications.

---

Dear Colleague :

You are invited to take part in an exciting new adventure.
As you may have read in the May 1993 Issue of SCAN Directions,
a clasified catalog of Individuals, institutions, and companies
that are involved In, or interested in, machine translation　— — — — — —
— — — — — — — — — — — — — —

FAX MESSAGE

No.93-108   To : Ms. Yuka Yamada      From : Tamami Davidson
            Cc : Mr Jiro Suzuki              with SCAN Inc.
                 Ms.Hanako Tanaka
                 With Maru-batu Corp.
1993.11.30

SUBJECT : Introducing a new Computer-Aided Language System for commercial applications.

Dear Colleague :

You are invited to take part in an excitiang new adventure.
As you may have read in the May 1993 Issue of SCAN Directions, aclasified catalog of Individuals, institutions, and companies that are involved In, or interested in, machine translation ------

P2.

P3.

It is ~~urged~~ that the next ~~Legislature~~ provide enabling funds so that an orderly implementation of the law may be effected.

As long as society respects those who accumulate riches, the deadlier, virus is not ~~him~~, it is ~~greed~~. ---------

FIG.27

| RX/OPERATOR | RX/FAX |
|---|---|
| (S1) SET SHEET | |
| (S2) ↓ SET MODE | |
| (S3) ↓ SPECIFY FILE BOX | |
| (S4) ↓ SPECIFY PAGES | |
| (S5) ↓ START → | (S6) STORE ORIGINAL TXT IN FILE A |
| | (S7) ↓ SACN |
| | (S8) ↓ OCR MARKED IMAGE & STORE TXT IN FILE B |
| | (S9) ↓ DETECT MARKED WORD |
| | (S10) ↓ TRANSLATE |
| | (S11) ↓ OUTPUT |
| | (S12) ↓ NOTIFY END |

W1. urged 3 【動】駆り立てる；促す；激励する；主張する；強要する
 【名】刺激；衝動

W2. Legislature 4 【名】州議会

W3. HIV 【送】Acronyn for human immunodeficiency virus which causes AIDS

W4. greed 3 【名】強欲；貪欲

TELECOMMUNICATION APPARATUS HAVING A CAPABILITY OF TRANSLATION

BACKGROUND OF THE INVENTION

The present invention generally relates to telecommunication and processing systems and more particularly to a facsimile telecommunication and processing system that is equipped with a communication unit for supporting a facsimile protocol, an OCR (optical character reader) unit for converting image data to character data or code, a translation unit for translating document data written in a first language to document data of a second language, and an image memory for storing image data.

The use of OCR devices for converting image data to character data is advantageous in view of easiness for modifying original image data as well as for reducing the amount of information. With wide spread use of the OCR devices, the cost of the OCR devices is also decreasing.

Meanwhile, there is a progress in the art of so-called machine translation for translating a language to another language by means of computer. The art of machine translation is thought particularly useful for converting languages having a significant difference as in the case of translating Japanese to other European languages and vice versa.

In the art of telecommunication, it is noted that recent buildup of public telecommunication network for connecting various telecommunication terminals and devices to form extensive, open telecommunication system or network, with standard telecommunication protocol used throughout the network, has lead to a rapid and wide spread use of facsimile apparatuses in the society. The growth of the facsimile market is still continuing and various facsimile apparatuses having various functions and capabilities are emerging.

In the field of machine translation, there is already a proposal, as in the Japanese Laid-open Patent Application 4-77965 in which an image acquired by a scanner is converted to a train of character codes that represent a text in the original language by means of an OCR unit, wherein the words in the original text thus reproduced are converted to corresponding words of a second language by referring to an electronic dictionary provided in the machine translation system. The words thus converted to the second language are then outputted via a printer.

The identification of language is relatively easy for human beings as long as the text is shown to him or her for visual recognition. On the other hand, the identification of language by machine such as computers based upon the character code of the text is not an easy task. Thus, it is generally necessary for a human operator to recognize the original language of the text and instruct the translating machine of the original language.

With wide spread use of facsimiles, instantaneous transmission and reception of letters or other documents are increasing. With increased international trades and economies, the use of English as a common, international language is increasing. On the other hand, such an increased use of English has caused problems, particularly to those who are not familiar with English, that the received message is not easily understood. Further, these persons have difficulties in writing documents in English and a considerable time is wasted for translating facsimile documents, received or to be transmitted. Thus, there is a demand for facsimile apparatuses that is equipped with translation function.

In applying the art of machine translation to facsimile apparatuses for translating received facsimile messages, it is possible to identify the original language based upon various commands included in the facsimile protocol. There is also a case in which the telephone number of the sender is described in the facsimile protocol. Thus, it is possible to automatically identify the original language of the text based upon such a telephone number. Alternatively, it is also possible to convert the received image data to character data by means of the OCR processing and carry out translation of the text from the original language to a target language. In the art of facsimile, it is also possible to provide special procedures in the facsimile protocol for handing over the information about the data to be transmitted including the language, such that the reception side facsimile apparatus can recognize the language of the facsimile transmission.

SUMMARY OF THE INVENTION

Accordingly, it is a general object of the present invention to provide a novel and useful telecommunication and processing system wherein the foregoing problems are eliminated.

Another and more specific object of the present invention is to provide a telecommunication apparatus for transmitting and receiving documents, wherein the telecommunication apparatus is equipped with capability of translating documents, written in a first language, to a second, different language.

Another object of the present invention is to provide a facsimile apparatus for transmitting and receiving documents in the form of image data, wherein the facsimile apparatus is equipped with a capability of character recognition for converting the image data to a corresponding character code and further with a capability of translating the document based upon the character code thus obtained.

Another object of the present invention is to provide a telecommunication apparatus equipped with the capability of translating received documents, wherein the telecommunication apparatus is further equipped with a capability of identifying the source language used in the received documents.

Another object of the present invention is to provide a facsimile apparatus equipped with the capability of translating received documents, wherein the telecommunication apparatus identifies the source language used in the received documents based upon a TSI (transmitting subscriber identification) message of a G3 facsimile protocol.

Another object of the present invention is to provide a facsimile apparatus equipped with the capability of translating received documents, wherein the facsimile apparatus identifies the source language used in the received documents based upon one or more of a telephone number, a sub-address and a UUI (user-user information) included in a SETUP command of a G4 facsimile protocol.

Another object of the present invention is to provide a facsimile apparatus equipped with the capability of translating received documents, wherein the facsimile apparatus identifies the source language used in the received documents based upon a calling terminal identifier included in a CSS (command session start) command of a G4 facsimile protocol.

Another object of the present invention is to provide a telecommunication apparatus equipped with the capability of translating received documents, wherein the telecommunication apparatus is further equipped with capabilities of sending and receiving messages to and from another, second telecommunication apparatus about non-standard capabilities supported by a telecommunication protocol used commonly by said telecommunication apparatus and said second telecommunication apparatus, wherein said telecommunication apparatus describes the language used in a document to be transmitted when transmitting documents to said second telecommunication apparatus, and wherein the telecommunication apparatus identifies the language used in a received document when receiving documents from said second telecommunication apparatus.

Another object of the present invention is to provide a facsimile apparatus equipped with the capability of translating received documents, wherein the facsimile apparatus is further equipped with a capability of sending and receiving messages to and from another, second facsimile apparatus about non-standard capabilities supported by a G3 facsimile protocol used commonly by said facsimile apparatus and said second facsimile apparatus, wherein said facsimile apparatus describes information about the language used in a document to be transmitted, when transmitting the document to said second facsimile apparatus, in said message about the non-standard capabilities and wherein said facsimile apparatus identifies the language used in a received document, when receiving the document from said second facsimile apparatus, from said message about the non-standard capabilities.

Another object of the present invention is to provide a facsimile apparatus equipped with the capability of translating received documents, wherein the facsimile apparatus is further equipped with a capability of sending and receiving messages to and from another, second facsimile apparatus about non-standard capabilities supported by a G4 facsimile protocol used commonly by said facsimile apparatus and said second facsimile apparatus, wherein said facsimile apparatus describes information about the language used in a document to be transmitted, when transmitting the document to said second facsimile apparatus, in said message about the non-standard capabilities and wherein said facsimile apparatus identifies the language used in a received document, when receiving the document from said second facsimile apparatus, from said message about the non-standard capabilities.

Another object of the present invention is to provide a facsimile apparatus equipped with the capability of translating a received document, wherein the facsimile apparatus is further equipped with a capability of character recognition and a capability of discriminating whether the received document is provided in the form of image data or not, and wherein the facsimile apparatus activates the character recognition when the document is provided in the form of image data.

Another object of the present invention is to provide a facsimile apparatus equipped with the capability of translating a received document, wherein the facsimile apparatus is further equipped with a capability of discriminating whether the received document is provided in the form of a plain text or a text embedded with control commands, and wherein the facsimile apparatus extracts the text alone when it is discriminated that the received document is embedded with control commands.

Another object of the present invention is to provide a telecommunication apparatus equipped with the capability of translating a received document, wherein the translation is achieved with a level corresponding to the level of expertise of language of an individual to which the document is directed.

Another object of the present invention is to provide a telecommunication apparatus equipped with the capability of translating a received document, wherein the translation is achieved in accordance with a level of expertise of language of an individual who has created the document.

Another object of the present invention is to provide a telecommunication apparatus equipped with the capability of translating a received document by referring to a dictionary provided in said telecommunication apparatus, wherein said telecommunication apparatus notifies, when the received document includes a word that is not included in said dictionary, to a calling party such that the received document includes a word not included in said dictionary.

Another object of the present invention is to provide a telecommunication apparatus equipped with the capability of translating a received document by referring to a dictionary provided in said telecommunication apparatus, wherein said telecommunication apparatus requests, when the received document includes a word that is not included in said dictionary, to a calling side facsimile apparatus to transmit a dictionary that contains said word.

Another object of the present invention is to provide a telecommunication apparatus equipped with the capability of translating a received document, wherein the telecommunication apparatus further has a capability of identifying a sender that has transmitted the document and storing the received document in a storage area allocated to the sender.

Another object of the present invention is to provide a facsimile apparatus for transmitting and receiving documents, wherein the facsimile apparatus further has capabilities of recognizing characters from image data of a received document and translating the received document based upon the characters thus recognized, wherein the telecommunication apparatus further has a capability of identifying a sender that has transmitted the document and storing the received document in a storage area allocated to the sender.

Another object of the present invention is to provide a telecommunication apparatus equipped with a capability of translating a received document, written in a first language, to a second, different language, wherein said telecommunication apparatus further includes first output means for outputting said received document in said first language and second output means for outputting said received document in said second language, and wherein one of said first and second output means is selectively activated.

Another object of the present invention is to provide a telecommunication apparatus equipped with a capability of translating a received document, written in a first language, to a second, different language, wherein said telecommunication apparatus further includes output means for outputting said received document simultaneously in said first language and said second language.

Another object of the present invention is to provide a telecommunication apparatus equipped with a capability of translating a received document, written in a first language, to a second, different language, wherein said telecommunication apparatus further includes output means for outputting said received document in said first language on a first side of a sheet and further in said second language on a second, opposite side of said sheet.

Another object of the present invention is to provide a facsimile apparatus equipped with a capability of translating a received document, written in a first language, to a second, different language, wherein the facsimile apparatus includes a scanner for reading a document from a sheet and a plotter for recording a document on a sheet, and wherein said facsimile apparatus detects a part of the document that is marked on a sheet and scanned by said scanner and translates only the marked part of the document to said second language.

Another object of the present invention is to provide a translation apparatus equipped with a capability of translating a received document, written in a first language, to a second, different language, wherein the translation apparatus includes a scanner for reading a document on a sheet and detects a part of the document that is marked on said sheet, and wherein the translation apparatus translates only the marked part of the document to said second language.

Other objects and further features of the present invention will become apparent from the detailed description when read in conjunction with the attached drawings.

BRIEF DESCRIPTION OF THE DRAWINGS

FIG. 8 is a diagram showing the structure of the non-standard procedure employing the present invention;

FIG. 10 is a diagram showing an example of the user administration table used in the present invention;

FIG. 11 is a diagram showing the user administration table in another state;

FIG. 12 is a diagram showing another example of the user administration table;

FIG. 13 is a diagram showing an example of the dictionary administration table used in the translation unit of FIG. 9;

FIG. 14 is a diagram showing an example of the basic dictionary used in the translation unit of FIG. 9;

FIGS. 15A–15C are diagrams showing examples of the personal dictionaries used in the translation unit of FIG. 9;

FIG. 16 is a diagram showing an example of the dictionary that is transmitted from the calling side terminal upon request from the receiving side terminal;

FIGS. 17A–17C are diagrams showing examples of translation with respective levels;

FIGS. 18–21 are diagrams showing the example of translation;

FIG. 22 is a diagram showing an example of the facsimile message;

FIG. 26 is a diagram showing an example of the transmitted document on which marking is made by the recipient for those words that are to be translated;

FIG. 27 is a diagram for the procedure for translating only the marked words on a given document;

FIG. 28 is a diagram showing an example of output of translation of marked words;

DETAILED DESCRIPTION OF PREFERRED EMBODIMENTS

Figure 1:
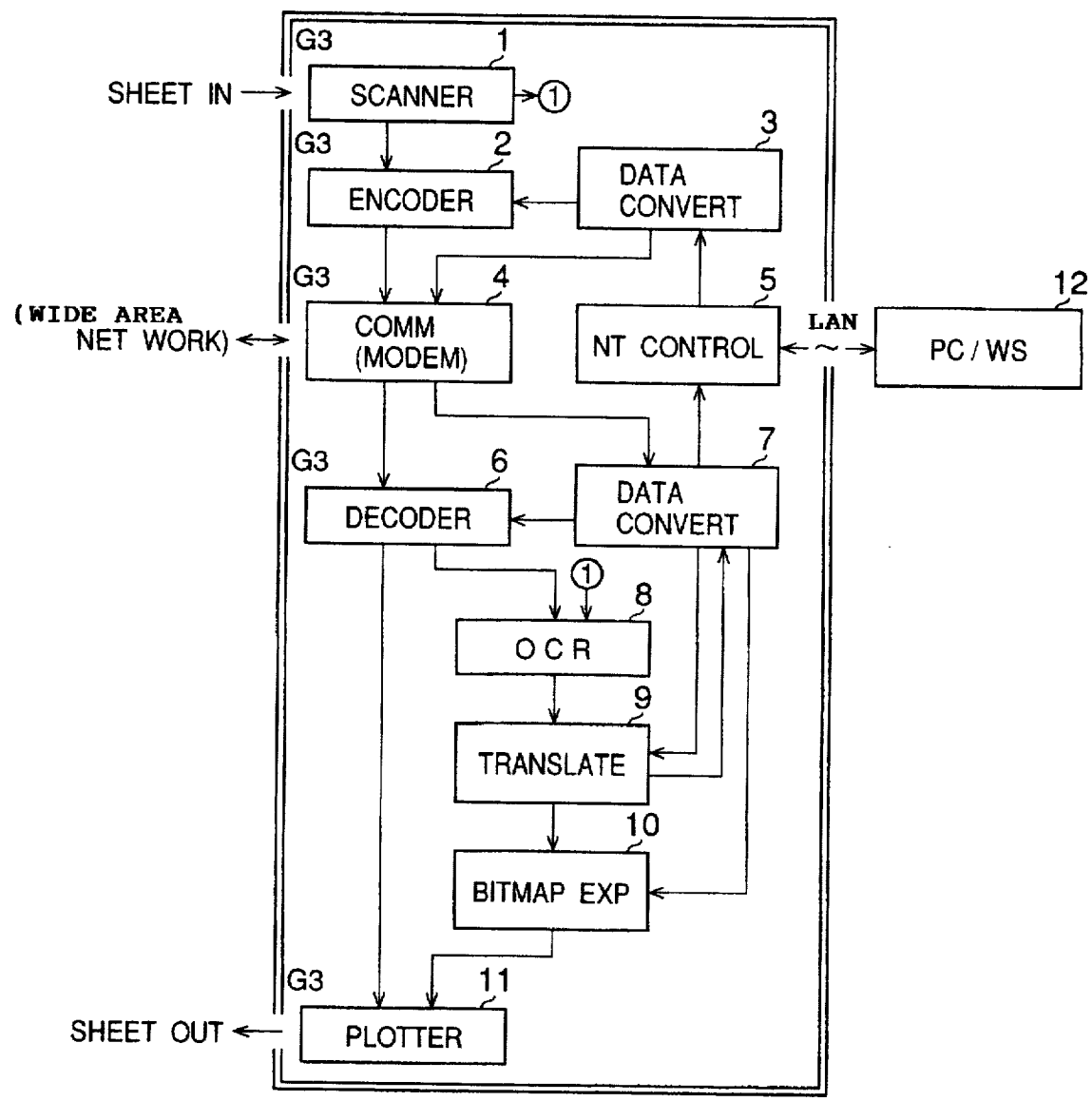
FIG. 1 is a block diagram showing the construction of a facsimile apparatus according to a first embodiment of the present invention.

FIG. 1 is a block diagram showing a first embodiment of the telecommunication apparatus of the present invention.

Referring to FIG. 1, the telecommunication apparatus is a G3 or G4 facsimile apparatus and includes a scanner 1 for scanning a document recorded on a sheet to produce image data or bitmap data. The image data thus produced is transferred to a data encoder 2 for data compression, wherein the data encoder 2 produces encoded image data of the MH, MR or MMR format as commonly practiced in the art of facsimile. The compressed image data thus produced is supplied to a communication unit 4 for transmission to a facsimile apparatus at a remote terminal via a telecommunication network such as wide area network (WAN) that includes PSTN (public switched telephone network), ISDN (integrated service digital network) or their equivalents.

When receiving a facsimile transmission from a remote facsimile apparatus, compressed image data of the MH, MR or MMR format is received at the communication unit 4. The received image data is then forwarded to a data decoder 6 that reproduces the original, rasterized image data by conducting a decompression of the received image data. The original image data thus recovered is then transferred to a plotter 11 for recording the reproduced image data on a recording sheet. In the G3 facsimile apparatus, the communication unit 4 supports the G3 facsimile protocol prescribed by the CCITT (comité consultatif international télégraphique et téléphonique) recommendation and includes a modem for modulating and demodulating an audible carrier. When the facsimile apparatus is to be connected to plural lines, plural number of the communication units 4 are provided. It is possible for the facsimile apparatus of FIG. 1 to transmit and receive data other than image data.

Further, the facsimile apparatus is provided with a network controller 5 connected to external processing apparatuses such as a personal computer or workstation 12 that is used for creating a document via a local area network (LAN), wherein it will be noted that the network controller 5 supplies the document created by the personal computer 12 to the communication unit 4 for transmission after data conversion in a data converter 3. It should be noted that the personal computer or workstation 12 creates documents in the form of image data, plain text, text embedded with control commands, or a mixture thereof. Thus, the data converter 3 supplies the document created by the personal computer 12 directly to the communication unit 4 when the document is given in the form of plain text or text that includes embedded control commands. When the document data is given in the form of image data, on the other hand, the data converter 3 transfers the document data to the communication unit 4 via the data encoder 2 for data compression. When the document is given from the personal computer 12 in the form of mixture of plain text, text embedded with control commands and image data, the data converter 3 extracts the plain text or the text embedded with control commands from the document and supplies the same to the communication unit 4 directly. Further, the data converter 3 extracts the image data from the document and supplies the same to the data encoder 2.

Further, when receiving documents of plain text or text with embedded control commands from a remote terminal, the received document is supplied to a data converter 7 from the communication unit 4 for conversion of data format such that the document is compatible with the processing in the personal computer 12. Thereby, the data converter 7 supplies the received document to the personal computer 12 as it is via the network controller 5, when the document is given in the form of plain text or text embedded with control commands. Alternatively, the data converter 7 supplies the plain text or text embedded with control commands to a bitmap expansion unit 10 for expanding to image data or bitmap data, and the image data thus produced by the unit 10 is supplied to a plotter 11 for recording on a recording sheet. Further, the data converter 7 supplies the image data in the received document to the data decoder 6 for data decompression, and the image data thus decompressed is then supplied to the plotter 11 for recording on a sheet. Further, the data converter 7 achieves a separation of text data and image data when the received document is given in the form of mixture of image data and text data.

It should be noted that the facsimile apparatus of FIG. 1 further includes an OCR (optical character reader) unit 8 for recognizing characters in the received image data. Thereby, the OCR unit 8 is supplied with the reproduced image data from the data decoder 6 and produces character codes corresponding to the recognized characters. Further, the facsimile apparatus includes a translation unit 9 that translates the received documents. More specifically, the translation unit 9 is supplied with the received document from the OCR unit 8 in the form of text data that includes character codes and translates the same from the original language to another language. The translation unit 9 thereby produces output text data representing the result of translation, and the text data thus produced is further supplied to the bitmap expansion unit 10 for conversion to image data or bitmap data. The image data thus obtained is then supplied to the plotter 11 for recording on a recording sheet. Alternatively, the translation unit 9 supplies the output text data to the data conversion unit 7 for transfer to the personal computer 12. In order to control various units, the system of FIG. 1 is includes a system controller not illustrated.

Figure 2:
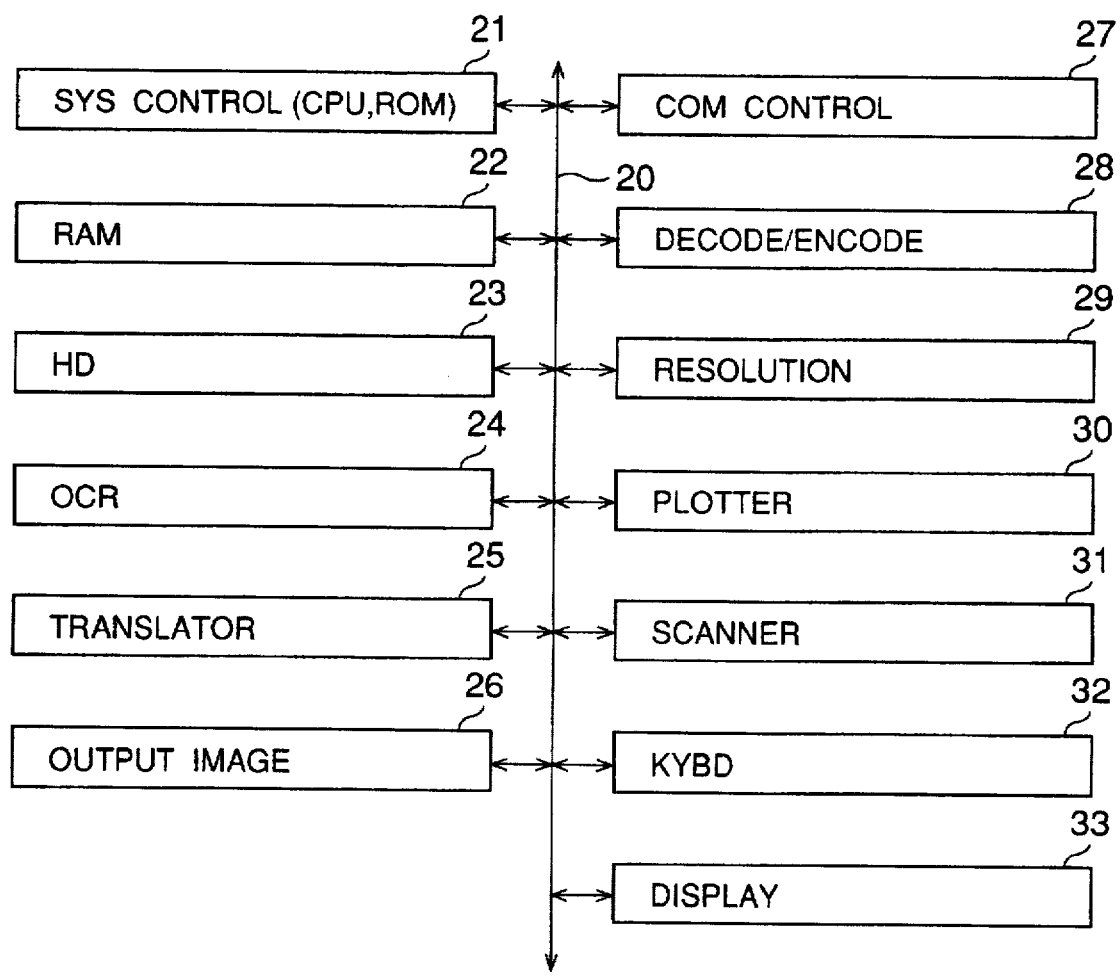
FIG. 2 is a block diagram showing the construction of a facsimile apparatus according to a second embodiment of the present invention.

FIG. 2 shows the construction of a telecommunication apparatus according to a second embodiment of the present invention.

Referring to FIG. 2, the telecommunication apparatus includes a system controller 21 that in turn includes a microprocessor CPU and a read-only-memory (ROM) connected to a system bus 20, wherein various units are connected to the system bus 20 for sending and receiving data to and from the system bus 20. Such units includes a random-access-memory (RAM) 22 cooperating with the microprocessor CPU in the system controller 21 as a main system memory for providing work area to the microprocessor, and a hard disk drive 23 acting as a storage of various programs and data in the form of files. It should be noted that the ROM in the system controller 21 stores therein basic programs and data used for controlling the system as well as a program used in the present invention described below. Further, there are provided an OCR (optical character reader) unit 24 for recognizing characters from given image data to produce text data indicative of the characters thus recognized, a translation unit 25 equipped with various dictionaries not illustrated, for translating a given text from a first, original language to a second different language, and an image expansion unit 26 supplied with text data such as the one produced by the OCR unit 24 or translation unit 25 into bitmap data for recording on a sheet.

Further, the telecommunication apparatus of FIG. 2 includes a communication controller 27 connected to a network such as the aforementioned PSTN or ISDN for establishing a connection with a remote terminal according to a predetermined protocol for call setup and transmission sequence, an image encoding/decoding unit 28 for compressing given image data to form compressed facsimile image data of the MH, MR or MMR format for facsimile transmission and for decompressing received facsimile image data of the MH, MR or MMR format to recover the original rasterized image data. Further, there are provided units such as a variable magnification unit 29 for changing the resolution of images, a plotter 30 for recording an image on a recording sheet, a scanner 31 for reading a document on a sheet, an input device 32 such as a keyboard, keypad, mouse, and the like used by an operator for inputting various commands, data, text, and the like, and a display unit 33 for displaying various visual messages to the operator.

In any of the first and second embodiments above, it should be noted that the translation unit 9 or 25 is activated in accordance with the language used in the original document that has been transmitted form a remote terminal. For this purpose, it is necessary to identify the source language in the received document. Hereinafter, the identification of the source language in the first and second embodiments will be described.

Figure 3:
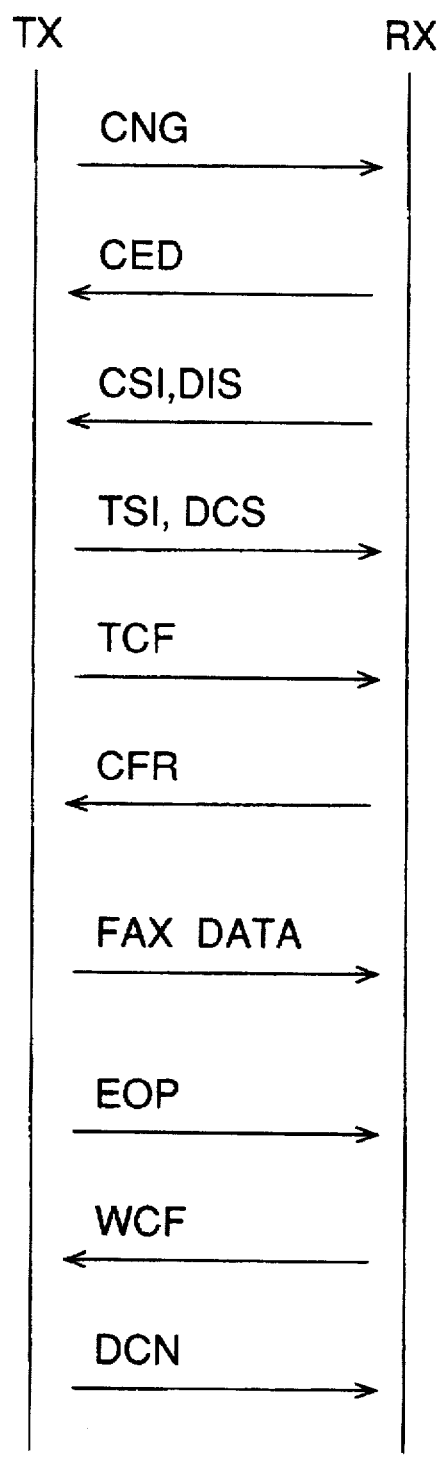
FIG. 3 is a diagram showing the protocol used in a G3 facsimile transmission.

FIG. 3 shows the sequence of the G3 facsimile protocol used conventionally.

As is well known in the art, the facsimile apparatus at a calling side terminal first sends a CNG (calling tone) signal to the facsimile apparatus at a reception side terminal, and the reception side apparatus returns a CED called station identification to the calling side apparatus. Further, the reception side apparatus sends a CSI (called subscriber identification) signal and a DIS (digital identification signal) signal to the calling side apparatus, and the calling side apparatus then sends a TSI (transmitting subscriber identification) signal and a DCS (digital command signal). It should be noted that the TSI includes a calling terminal identifier in a facsimile information field provided therein for identifying the calling terminal. Typically, the calling terminal identifier is given in the form of telephone number of the calling terminal.

Further, the calling side apparatus sends a TCF (training check signal) to the reception side apparatus, and the reception side apparatus returns a CFR (confirmation-to-receive) signal. In response to the CFR, facsimile data is transmitted from the calling side apparatus to the reception side apparatus. After completion of the facsimile data transmission, an EOP (end-of-procedure) signal is transmitted from the calling side apparatus to the reception side apparatus, and a MCF (message confirmation) signal is returned from the reception side. In response, the calling side apparatus sends a DCN (disconnect) signal to the reception side apparatus.

Thus, it will be understood that there is a possibility to use the calling terminal identifier in the TSI message for identifying the source language of the document. For example, the facsimile transmission from the United States includes the telephone number of the calling terminal in the form of 1-xxx-xxx . . . , wherein the first digit "1" indicates the United States. In the case of a call from the Great Britain, the telephone number of the calling terminal is described in the TSI command as 44-xxx-xxx . . . Similarly, the facsimile transmission from France, Germany, and Italy includes the telephone number of the calling terminal in the TSI message as 33-xxx-xxx . . . , 49-xxx-xxx . . . , 39-xxx-xxx . . . , respectively. When the telephone number starts with the digit "1" or "44," it is likely that the facsimile message is written in English. Thus, the apparatus of FIG. 1 or FIG. 2 activates the translation unit with English as the source language and Japanese as the target language, provided of course that the apparatus is located in Japan. When the telephone number in the TSI command starts with the digit "33, " the translation unit is activated with French as the source language. Similarly, when the telephone number in the TSI command starts with the digit "49" or "39," the translation unit is activated with German or Italian as the source language. Such a control of the translation unit 25 is achieved by the system controller 21 in the embodiment of FIG. 2. In the embodiment of FIG. 1, the control of the translation unit 9 is achieved by the data converter 7 that receives the TSI message from the communication unit 4.

A similar control of the translation unit based upon the source country of the facsimile transmission is possible also in the G4 facsimile apparatus.

Figure 4A:
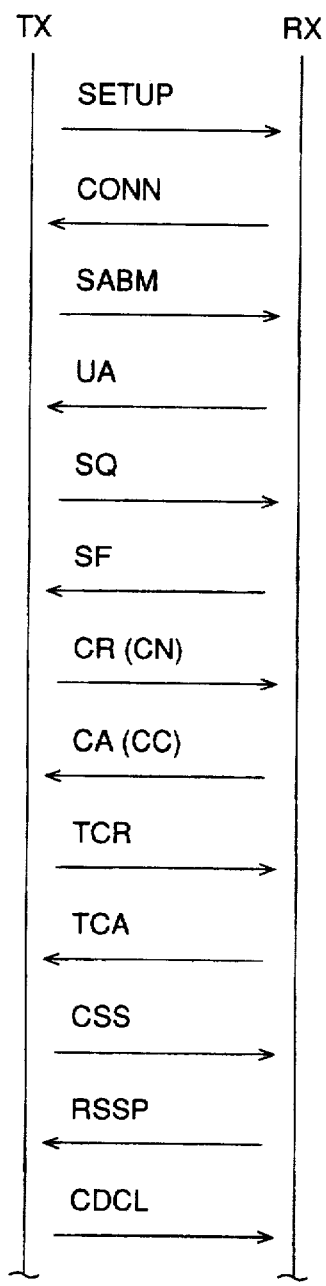
FIGS. 4A and 4B are diagrams showing the protocol used in a G4 facsimile transmission.
Figure 4B:
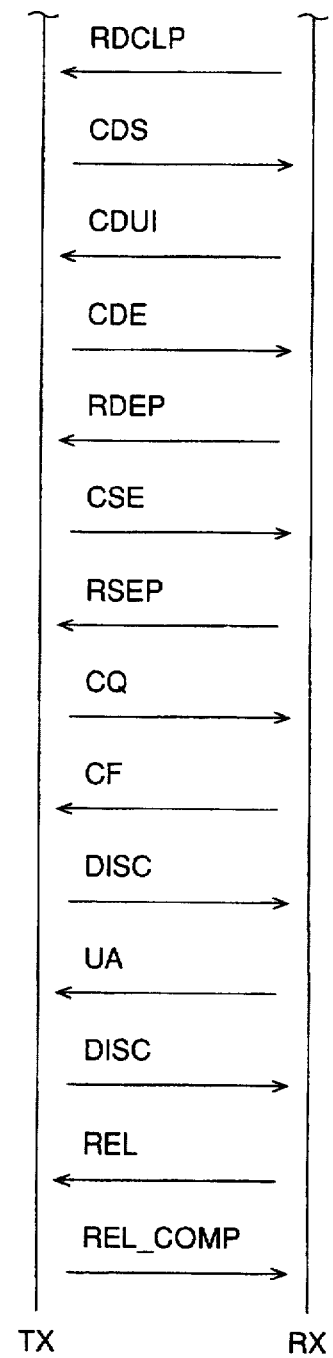

FIGS. 4A and 4B show the conventional G4 procedure used in the G4 facsimile apparatus.

Referring to FIG. 4A, a SETUP message is transmitted from the facsimile apparatus of a calling side terminal to the facsimile apparatus of a receiving side terminal, and the reception side apparatus returns a CONN (connect command) to the calling side apparatus. In response, the calling side apparatus transmits a SABM (set-asynchronous-balanced-mode) message to the reception side. Further, the reception side apparatus transmits an UA (unnumbered acknowledgement) message to the calling side terminal, and the transmission side apparatus sends a SQ (restart request) message. Further, the reception side apparatus transmits a SF (restart confirmation), and the calling side apparatus returns a CR (call request) message or a CN (incoming call) message. In response to the CR message or CN message, the reception side apparatus returns a CA (call accepted) message or a CC (call connected) message. Further, the calling side apparatus transmits a TCR (transport connection request) message to the reception side, and the reception side apparatus responds by sending back a TCA (transport connection accept) message. Then, the calling side apparatus transmits a CSS (command session start) message and the reception side apparatus returns a RSSP (response session start positive) message.

Further, the calling side apparatus transmits a CDCL (command document capability list) message, and the reception side apparatus returns a RDCLP (response document capability list positive) message. Further, the calling side apparatus transmits a CDS (command document start) message to the reception side, followed by a transmission of a CDUI (command document user information) message and CDE (command document end) command. Thereby, the document is transmitted from the calling side to the reception side, and the reception side apparatus returns the RDEP (response document end positive) message in response to the CDE message. Further, the calling side apparatus transmits a CSE (command session end) message to the reception side, and in response to this, the reception side apparatus returns a RSEP (response session end positive) message. Further, the calling side apparatus sends a CQ (clear request) message. The reception side then returns a CF (clear confirmation) message to the transmission side, and the calling side apparatus transmits a DISC (disconnect) message to the reception side. Thereby, the reception side returns the UA (unnumbered acknowledgement) and the calling side transmits the DISC message once more. In response, the reception side returns a REL (release) message, and the calling side transmits the REL_COMP (release complete) message.

In the above procedure of G4 facsimile transmission, the SETUP message and the CSS message include the telephone number as a parameter. Thus, it is possible to identify the source country of the facsimile transmission based upon the country code of the telephone number therein. Thereby, the translation unit is activated in accordance with the source language of the source country. Further, it should be noted that the caller sub-address of the SETUP message or the calling terminal identifier of the UUI or CSS message includes area for description by characters, in addition to the area for numerals. Thus, by designating the language such as English, French, . . . , in such an area of the calling terminal identifier in correspondence to the language used in the document, it is possible to activate the translation unit in accordance with the source language. Further, it is possible to suppress the activation of the translation unit, depending upon the description in such an area.

Figure 5:
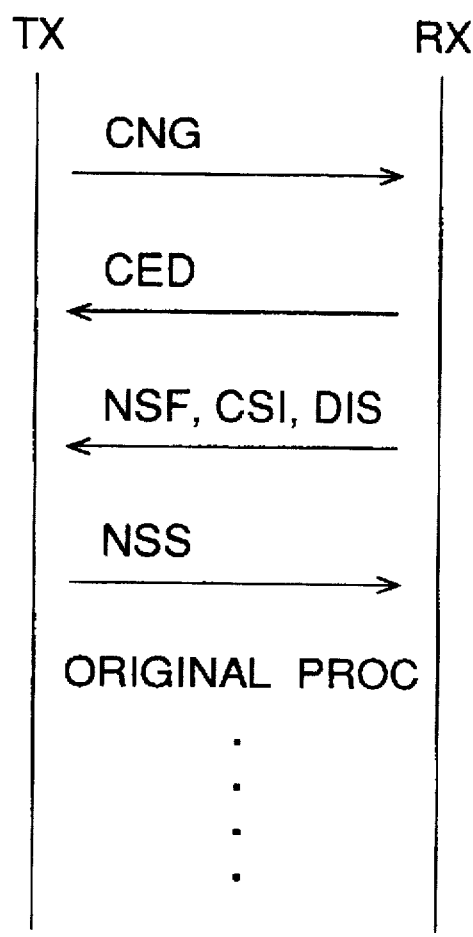
FIG. 5 is a diagram showing a non-standard procedure provided in the G3 facsimile protocol.

It should be noted that the G3 or G4 facsimile protocol can include original, non-standard procedures in addition to the standard procedures. Thus, it is possible to use such original procedures for designating the source language of the facsimile transmission. FIG. 5 shows such an original procedure provided in the G3 facsimile protocol, wherein it will be noted that the reception side apparatus transmits a NSF (non-standard facility) signal in addition to the CSI and DIS signals. In response to the NSF signal, the calling apparatus transmits a NSS (non-standard setup) signal to the reception side, followed by a transmission of original procedures.

Figure 6:
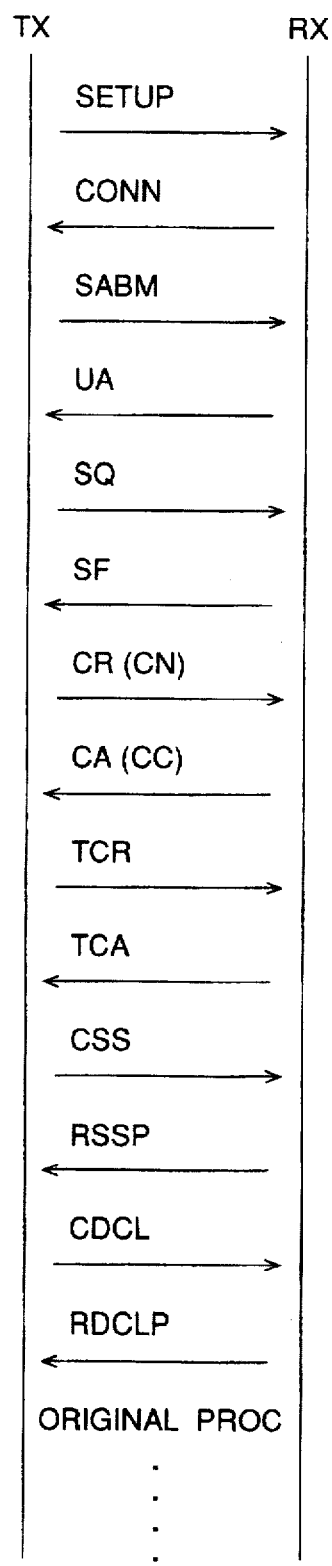
FIG. 6 is a diagram showing the G4 facsimile protocol including a non-standard procedure.

FIG. 6 shows the original procedures provided in the G4 facsimile procedure. In the example of FIG. 6, it will be noted that the original procedure starts after the RDCLP message.

Figure 7:
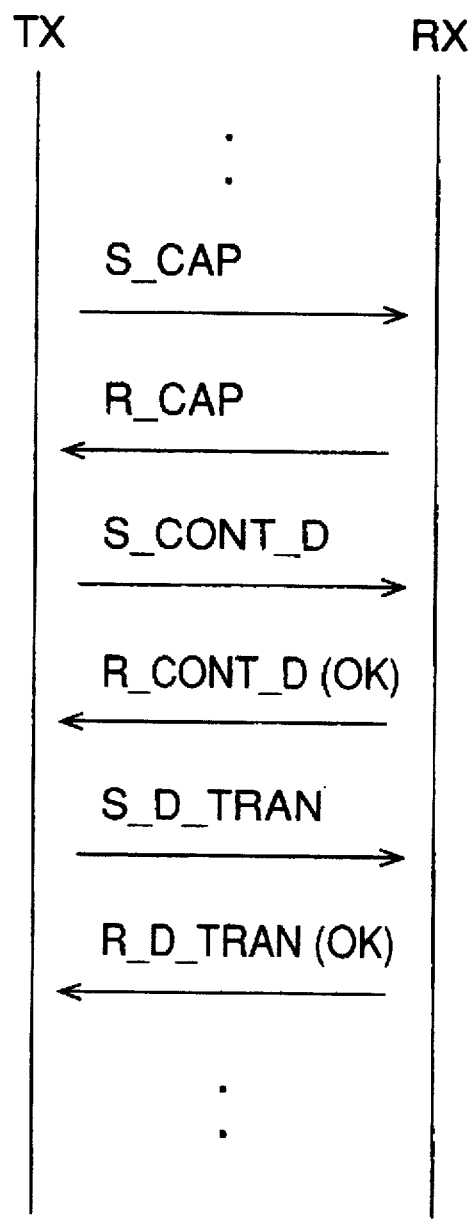
FIG. 7 is a diagram showing the non-standard procedure of the G4 facsimile protocol.

FIG. 7 shows an example of the protocol sequence that includes the original procedure used in the procedure of FIG. 5 or FIG. 6.

Referring to FIG. 7, the calling side apparatus transmits a S_CAP (sending-side-capabilities) message to formats and languages, and the reception side in turn returns a R_CAP message indicative of the formats and languages supported by the reception side apparatus.

In response, the calling side apparatus transmits a S_CONT_D (sending-side content document) message indicative of the data format and the language used for the transmission that is to be achieved. The reception side thereby acknowledges the S_CONT_D message by returning a R_CONT_D(OK) (receiving-side content document OK) message. Then, the transmission side apparatus transmits data with a S_D_TRAN (sending-side data transmission) message, and the reception side acknowledges by sending back a S_D_TRAN(OK) (receiving-side data transmission OK) message.

FIG. 8 shows an example of the data format used for the S_CAP message and the R_CAP messages.

Referring to FIG. 8, it will be noted that the first two bytes are used for describing the command name such as S_CAP or the R_CAP, and the area after the third byte, including the third byte, is used for indicating the support of the data format or language. It should be noted that each bit corresponds to a data format or a language, and a flag "1" is set, in each bit, to indicate that a support is provided to the corresponding data format or language.

Thus, the system controller such as the controller 21 of the reception side apparatus reads the content of the bits in FIG. 8 and activates the translation in accordance with the source language of the received document. For example, when the received document is given in the form of plain text, the document is directly forwarded to translation. On the other hand, when the document is given in a format A, the document is converted to a plain text before it is forwarded to the translation unit 9 or 25 for translation. The conversion of received document to the plain text may include various processes such as a direct conversion by means of software or conversion to image data followed by an OCR process. Thus, when the received document is given in the form of plain text with the identification of the source language, the document is directly forwarded to the translation unit. On the other hand, when the received document is given in the form of image data with identification of the source language, the document is once subjected to the OCR process for recovering the plain text data. The translation is activated based upon the plain text data thus recovered.

Figure 9:
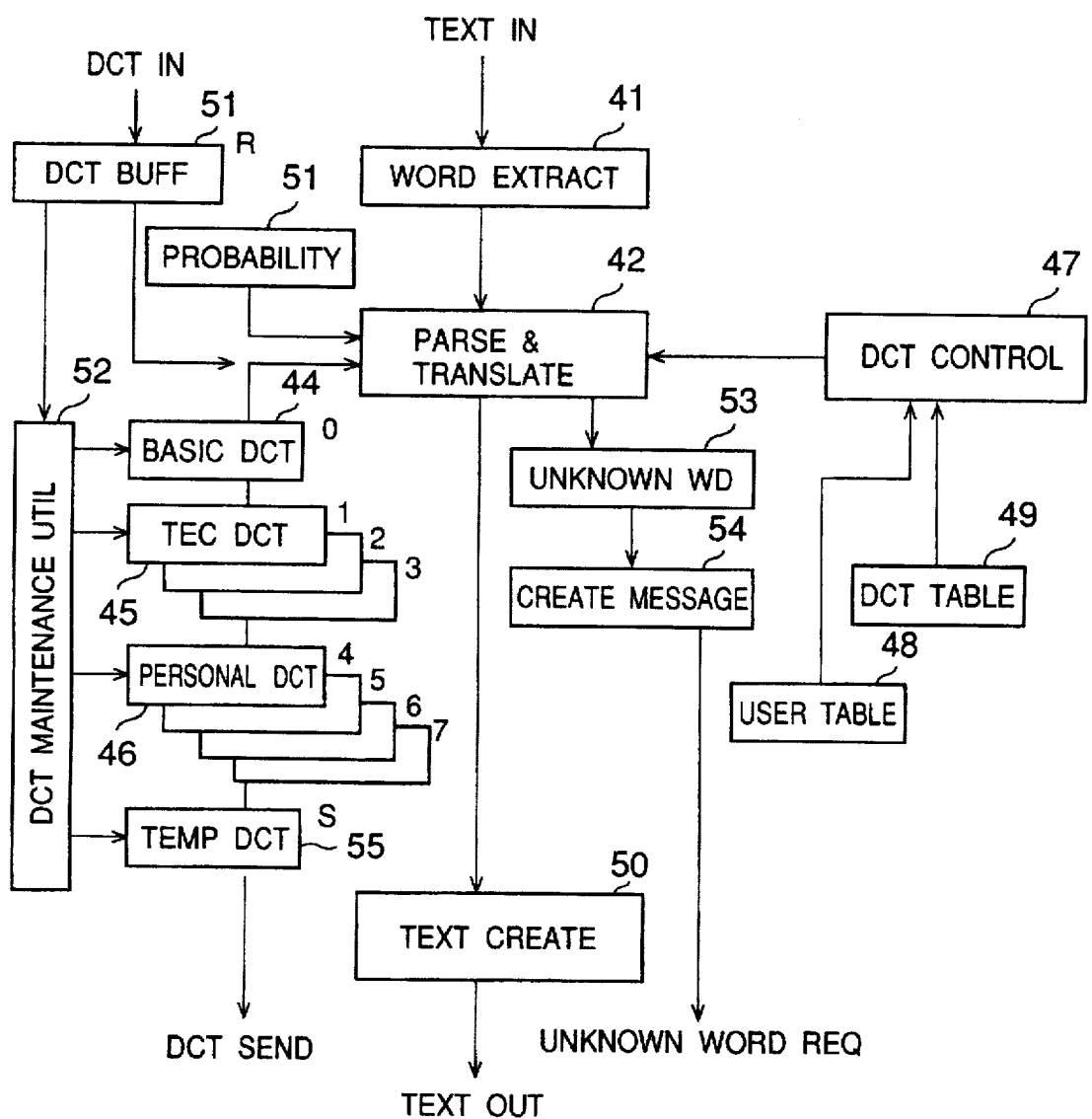
FIG. 9 is a block diagram showing the construction of a translation unit used in the facsimile apparatus of the present invention.

FIG. 9 shows the construction of the translation unit 9 or 25 described previously with reference to FIG. 1 or 2, wherein the translation unit is supplied with a text and achieves a translation of the same from a first, source language to a second, target language. Hereinafter, the description will be given for a case of translating English to Japanese. However, the translation unit achieves translation between other combination of languages such as Japanese to English, English to French, French to English, . . . , as well.

Referring to FIG. 9, it will be noted that the translation unit 9 includes a word separation unit 41 for separating a sentence in the given text into individual words based upon spacing, hyphenation, and the like in the sentence. The words thus extracted are then supplied to a parsing and translating unit 42 that estimates the part-of-speech of the word, based upon the succession of words. In order to estimate the part-of-speech, there is provided a probability table 43 for each source language, such that the table 43 contains probability of occurrence of various succession of words. The parsing and translating unit 42 thereby estimates the part-of-speech of the given word based upon the probability in the table 43. Generally, a trigram parsing is achieved in the parsing and translating unit 42 wherein succession of three words is subjected to examination when conducting parsing.

The parsing and translating unit 42 further refers to dictionaries such as a basic English-Japanese dictionary 44, one or more technical dictionaries 45 of specific technical fields, and a personal dictionary 46 provided in correspondence to the individuals who use the facsimile apparatus for specific terms, and provides a translation of the words. The words thus translated are then supplied to an output text creation unit 50 that creates an output text based upon the translation of the words supplied thereto from the parsing and translating unit 42. The output text creation unit 50 thereby selects one of two output formats, the one in which the translation of word is shown adjacent to the original word, and the other in which the translation of word is shown in the form of list.

It should be noted that the parsing and translating unit 42 searches through the dictionaries 44-46 for translation of words under control of a retrieval control buffer 47, wherein the retrieval control buffer 47 specifies the order and extent for scanning the dictionaries based upon information about the level of English expertise of the individual to which the facsimile transmission is directed. For this purpose, the retrieval control buffer 47 cooperates with a user administration table 48 that includes information about the level of expertise of English for the individuals who use the facsimile apparatus. Further, the retrieval control buffer refers to a dictionary administration table 49 that includes the list of the dictionaries 44-46 together with the type or level of the individual dictionaries as indicated by numerals at the upper right corner of the dictionaries 44-46. Thus, when the level of expertise of English of a person is high, only selected words are translated from the personal dictionary 46 or technical dictionary 45. On the other hand, when the level of the person is low, the translation is given to the majority of the words with reference to all of the dictionaries 44-46.

Further, when there is a word not included in any of the dictionaries 44-46, the unrecognized word is held in a word buffer 53, and a message creation unit 54 creates a message warning the sender that the translation at the reception side is incomplete in view of the unknown word. Alternatively, the message creation unit 54 creates a message such that the message urges the sender to transmit a dictionary or part of dictionary that explains the unknown word.

In order to receive the dictionary thus transmitted upon request, there is provided a buffer dictionary 51, and the parsing and translating unit 42 translates the unrecognized word based upon the content of the buffer dictionary 51. Further, in order to meet the demand of the other party urging for transmission of dictionary of unrecognized word, the translation unit of FIG. 9 includes a temporary dictionary 55 that stores a part of the content of the dictionary related to the unrecognized word, wherein such a content may be extracted from one or more of the dictionaries 44-46. Further, in order to achieve maintenance of the dictionaries 44-46 as well as the dictionaries 51 and 55, there is provided a maintenance utility unit 52 that updates the content of the dictionary based upon the content of the buffer dictionary 51. The maintenance utility unit 52 also extracts the requested word from a suitable dictionary and accommodates the same in the temporary dictionary 55 for transmission.

FIGS. 10–12 show the examples of the content of the user administration table 48.

Referring to FIG. 10 showing an example of the user administration table of a SCAN Inc., located in the United States, it will be noted that the table includes a user field for designating the user name, file box field for the file box address (=facsimile device address), and a facsimile address field for the facsimile telephone number or the personal address appended to the facsimile telephone number. It will be noted that, in the field of user name, the same person can enter different names. In the illustrated example, Takashi Itch is registered by the alphabetical representation and also by the Kanji representation. It is also possible to use nickname or just be anonymous. The file box represents the device address of the facsimile apparatus. For example, the facsimile apparatuses of the SCAN Inc have a common file box address of */scan. By using the file box address, it is possible to indicate the sender address in each transmission, including the own apparatus. Thus, in the office in which the facsimile apparatus is provided, the address of the file box is given for each of the individuals of the office who use the facsimile apparatus.

Further, the field for the telephone number includes the facsimile telephone number of the facsimile apparatus, provided that the user name in the user field indicates office or company. When there are plurality of users in the facsimile apparatus as indicated by the individual name in the user filed, on the other hand, the field of the telephone number includes the personal address of the individuals. Thereby, it should be noted that the telephone number of the own apparatus, for example the one used in the SCAN Inc., is designated with a minus sign "31 " at the head of the phone number. When describing the telephone number of other facsimile apparatuses, a plus sign "+" is given at the head. It should be noted further that the personal address in the telephone number field of the table of FIG. 10 represents the file box number of the individuals or the address of the personal computer or workstation of the individuals, connected by means of the network controller such as the device 5 of FIG. 1. Thereby, the telephone numbers are attached with "+" or "−" at the head part as already noted, while the address of the individuals is attached with "*" at the head part. Further, the designation "*/" indicates that the personal address of the individuals designates a file provided in the own facsimile apparatus. When an alphanumeric designation follows the designation "*," on the other hand, this indicates the user address of the computer connected to the facsimile apparatus by way of the network controller Further, the user administration table of FIG. 10 includes a status flag indicative of currently connected calling and/or called parties.

Further, the table of FIG. 10 includes a field for describing the level of expertise of language such as English for each individuals, wherein it will be noted that this field is provided for each of the facsimile users connected by way of the network. The numbers described in this field correspond to the level of the dictionaries 44–46 to be used when conducting the translation in the translation unit of FIG. 9. Thus, by changing the number in this field, it is possible to change the setting of the level of language. Further, it will be noted that there is provided another, second field for the level of expertise of the language, wherein the second field describes the level of the dictionaries used for translation at the calling side apparatus. It should be noted that this field is used when transmitting a document together with a translation thereof.

Further, the user administration table of FIG. 10 includes a field for designating the dictionary to be used at the reception side. In this field, the dictionary is designated with the number used in the dictionary administration table 49 to be described later and it is possible to designate a plurality of dictionaries at the same time.

in addition, the table of FIG. 10 includes a second field for dictionary for designating the dictionary to be transmitted when activating translation in the reception side apparatus. In this mode of operation, the dictionary used for translation is transmitted from the calling side apparatus to the reception side apparatus, either unconditionally or upon request of the reception side apparatus. Again, it is possible to designate a plurality of dictionaries in this field by describing the number of the dictionary or dictionaries used in the dictionary administration table 49. In this case, the dictionary to be transmitted is once stored in the temporary dictionary 55 for transmission, as described previously with reference to FIG. 9.

In FIG. 10, it should be noted that the file box address is not set for the individuals in the reception side such as the Maru-batsu Corp. in Japan. FIG. 11 shows a case in which the file box address is set for the users in the Maru-batsu Corp.

Referring to FIG. 11 showing the user administration table in the SCAN Inc, it will be noted that Yuka Yamada, Jiro Suzuki and Hanako Tanaka, all of Matu-batsu Corp., are designated with a common file box address of */marubatsu. Further, Yuka Yamada has a personal address of */yuka appended to the telephone number +81-3-3210-1230. Similarly, Jiro Suzuki and Hanako Tanaka have respective personal addresses appended to the telephone number of the Maru-batsu corp., wherein the designation "+" represents the reception side terminal when viewed from the SCAN Inc. and the first two digits "81" indicate of course the country code of Japan.

In the state of the user administration table of FIG. 11, it will be noted that the status flag of Tamami Davidson of the SCAN Inc. is set to "1," indicating that a connection is established between the SCAN Inc. and another party, with Tamami Davidson as the party at the side of the SCAN Inc. Associated with this, the status flag of the SCAN Inc. is also set to "1." In correspondence to this, it will be noted that the status flag is set to "1" for all of the registered members of the Maru-batsu Corp of Japan, indicating that a broadcasting is in progress from Tamami Davidson of SCAN Inc. to the registered individuals of the Maru-batsu Corp.

FIG. 12 shows the corresponding user administration table in the side of the Maru-batsu Corp of Japan. It will be noted that the telephone number of the Maru-batsu Corp. now has the "−" header indicating that the user administration table is the one for the Maru-batsu Corp. In the illustrated example, there exists a fourth user, Taro Sato, in the Maru-batsu Corp, who is not registered in the SCAN Inc. In correspondence to the broadcast from Tamami Davidson of the SCAN Inc., it will be noted that the status flag is "1" for Yuka Yamada, Jiro Suzuki and Hanako Tanaka, in addition to the status flag of Tamami Davidson of the SCAN Inc.

FIG. 13 shows an example of the dictionary administration table 49.

Referring to FIG. 13, the dictionary administration table 49 includes the serial designation of the dictionaries as well as the designation of dictionary type, wherein "R" represents the serial designation of the dictionary received from a calling apparatus, "S" represents the serial designation of the temporary dictionary to be transmitted upon request, "0" represents the serial designation of the basic dictionary 44, "1" represents the technical dictionary 45 for the mechanical field, "2" represents the serial designation of the technical dictionary 45 for electronic field, ... Further, the designation of dictionary type includes "−" for the dictionaries received or to be transmitted, "0" for the basic dictionary, "1" for the technical dictionary, and "2" for the personal dictionary. In the table of FIG. 13, it should be noted that one may provide any desired serial to the dictionaries except for the serials "R", "S" and "O" that are reserved.

FIG. 14 shows an example of the content of the basic dictionary 44.

Referring to FIG. 14, the basic dictionary 44 includes the entry of English words for searching and corresponding translation in Japanese just like other English-Japanese dictionary, except that there is provided a designation of the level of English expertise for each of the English words. Thus, the level "0" represents that the word having the level "0" is a fundamental word in English. Generally, the level "0" is given to simple prepositions, fundamental verbs such as "be," "have," "make," and the like, and pronouns. In the illustrated example, five levels are set according to the increasing level of expertise.

FIGS. 15A–15C show examples of the personal dictionaries 46 respectively for Yuka Yamada, Jiro Suzuki and Taro Saito. It will be noted that each of the personal dictionaries has a structure identical to that of the basic dictionary shown in FIG. 14. Thus, further description thereof will be omitted.

FIG. 16 shows an example of the temporary dictionary 55 created upon request of the reception side.

In the temporary dictionary 55, it will be noted that the level is set to "5" throughout, and the default word type is set to "transmitted word." In the temporary dictionary 55, it should be noted that the content of the dictionary is not limited to the translation of the word but may include the explanation about the word written in any of the languages, as indicated in the example of FIG. 16.

Hereinafter, the translation of the transmitted document at the reception side apparatus will be described in detail. In the explanation hereinafter, it is assumed that the transmission of the document is made in the G3 facsimile protocol, and the translation is achieved automatically in the reception side apparatus. The illustrated example shows a case in which Tamami Davidson of the SCAN Inc. of the United States transmits a document from a facsimile apparatus of the SCAN Inc., to Yuka Yamada, Jiro Suzuki and Hanako Tanaka, all of the Maru-batsu Corp. and use a reception side facsimile apparatus in the foregoing Maru-batsu Corp.

The user administration table for this case is already explained with reference to FIGS. 10–12. Thus, the level of English of Yuka Yamada is set to "1," the level of English of Jiro Suzuki is set to "3," and the level of English of Hanako Tanaka is set to "4." Thus, the level of the basic dictionary 44 is set to the level "1" or higher, "3" or higher and "4" or higher for the respective users. Further, Yuka Yamada enters "4" in the dictionary field of the user administration table of FIG. 12, indicating the use of the personal dictionary 4 for Yuka Yamada when translating the document for Yuka Yamada. See the definition of dictionaries given in the dictionary administration table of FIG. 13. Similarly, Jiro Suzuki specifies the use of the dictionary 2 in the user administration table 12, indicating that the electronic dictionary 2 is to be used in the translation for Jiro Suzuki. On the other hand, Hanako Tanaka specifies no particular dictionary. Thus, the translation of the document for Hanako Tanaka will be made with reference to the basic dictionary alone.

The content of the basic dictionary is already described with reference to FIG. 14. On the other hand, the personal dictionary for Yuka Yamada is shown in FIG. 15A. It will be noted that the personal dictionary includes the translation of word "legislature" as a noun indicating a state council. Further, there are translations of other words for personal use of Yuka Yamada. Thus, with reference to the user administration table, it is possible to identify that the specified personal dictionary is the one for Yuka Yamada, when the transmission is directed to her.

Next, the word-to-word translation function will be described with reference to the block diagram of FIG. 9 for a case in which a text "It is urged that the next Legislature provide enabling funds so that an ordinary implementation of the law may be effected." by way of transmission of document form a calling terminal.

The text if first supplied to the word separation unit 41 for extracting individual words from the text. The words thus extracted are then supplied to the parsing and translating unit 42 for identification of the parts-of-speech and translation of the given word, wherein the parsing and translating unit 42 refers to the dictionaries for all of the words in the text. Further, the parsing and translating unit 42 refers to the probability table 43 and identifies the part-of-speech according to a beam search process. Thereby, the dictionaries are referred to according to the order of the basic dictionary 44, the technical dictionary 45 and the personal dictionary 46. Simultaneously to the identification of the part-of-speech, the unit 42 determines the break of sentence and numbers the sentences in the text.

Next, the translation of the individual words is conducted according to the level of English expertise. Thereby, the translation may be different depending upon the level. Further, no translation will be given for fundamental words designated by level 0 in the basic dictionary.

The basic dictionary 44 having the dictionary type 0 (see Table 13) is always referred to by the parsing and translating unit 12, while the order for outputting the translation is determined according to the value used for describing the type of the dictionary, when the use of the personal dictionary 46 is specified. Thus, the personal dictionary is referred to preferentially with respect to the basic dictionary. When there are plural dictionaries having the same level of dictionary type, the selection of the dictionary is made according to the order of the dictionary serial in the dictionary administration table 49. Thus, in the case of the word "Legislature," which is included in both the basic dictionary 44 and the personal dictionary 46 of Yuka Yamada, the personal dictionary 46 is preferentially used.

When outputting the translation, it should be noted that only those words having a level of expertise that exceeds the level of expertise of the user are outputted. Thus, in the case of Yuka Yamada whose level of expertise of English is "1," all the words that exceed the level "1" are outputted.

The output text creation unit 50 receives the translation of words thus obtained from the parsing and translating unit 42. In a first setting of the translation unit that indicates the output of translation attached to each word of the original text, one obtains an output text as indicated in FIG. 17A, wherein FIG. 17A shows a case for Yuka Yamada. It should be noted that the first bracketed number [35] indicates the sentence number in the given text. FIG. 17B shows an example of translation for Jiro Suzuki for the same sentence, and FIG. 17C shows a similar example for Hanako Tanaka. In the case of Hanako Tanaka wherein no personal dictionary or technical dictionary is indicated, the translation is made based upon the basic dictionary only.

When the translation unit is indicated to provide output in the form of word list, on the other hand, the output text creation unit 50 creates a list of translated words. In the output list, all the candidate translations are listed for each word, contrary to the case of FIGS. 17A–17C that outputs only the translation at the top of the candidate translations. Similarly to the previous case, only those words of which level exceeds the level of expertise of English of the user are listed in the output. Further, the words are listed in the output list according to the order of appearance in the text.

FIG. 18 shows an example of the output list for Yuka Yamada, wherein the same user administration table and dictionary administration table are used as in the case of FIG. 17A.

Next, the case in which the reception side user has found unknown word in the translation will be described for an example in which the word "legislature" is not included in the dictionary used for translation.

In such a case, the unrecognized word as well as the sentence that includes the unrecognized word are sent to the word buffer 53. Similarly, an unrecognized word "HIV" is transmitted together with the sentence, "As long as society respects those who accumulate riches, the deadlier virus is not HIV, it is greed." to the word buffer 53.

Thus, after completion of the first time translation, the reception side user takes out the content of the word buffer 53 and transfers the same to the data converter 7 of FIG. 1 or to the encoder/decoder 28 of FIG. 2, together with a message "I don't understand the following words. Please sent these words again along with an explanation." It should be noted that such a message is created by the message creation unit 54 of FIG. 9.

In the case of the system of FIG. 1, the message thus created is transferred further to the network controller 5, wherein the network controller 5 forwards the same to the data converter 3 for transmission. The message is further transferred to the communication unit 4 and the communication unit 4 transmits the message to the transmission side facsimile apparatus in the SCAN Inc. together with a tag indicating that the document is a response to the previously transmitted document. The tag is sent as a protocol command. In response, the transmitter, Tamami Davidson, of the SCAN Inc. reads the content and activates a dictionary creation mode in her facsimile apparatus. Thereby, Tamami Davidson describes a text such as "Legislature: state assembly" or "HIV: Acronyms for human immunodeficiency virus which causes AIDS" and forwards the same to the temporary dictionary 55. The text of the temporary dictionary 55 is then shaped by the maintenance utility unit 52 of the dictionary and is set in the temporary dictionary 55 with a form similar to the one shown in FIG. 16 for transmission. When transmitting the dictionary in the temporary dictionary 55, the tag returned from the reception side is attached, indicating that the transmission is a response to the request from the reception side asking for transmission of dictionary for translation in the reception side.

FIG. 19 shows an example of the result of translation finally obtained for Yuka Yamada and outputted in the form of word list, including the content of the dictionary transmitted from the calling side terminal upon request.

The facsimile apparatus shown in FIG. 1 or FIG. 2 is also capable of transmitting documents together with a translation. Hereinafter, this function of the facsimile apparatus will be described with reference to an example for forwarding a document transmitted from Tamami Davidson of the SCAN Inc. to Yuka Yamada, Jiro Suzuki and Hanako Tanaka of the Maru-batsu Corp., further to the Koh-otsu Inc. There are several possibilities for carrying out such a forwarding of the document.

(1) Direct operation by unregistered user of Maru-batsu Corp.

In this case, a user of the Maru-batsu Corp. designates "Maru-batsu Corp." in the field for destination of the facsimile transmission, and the user administration table of FIG. 12 is transferred to an automatic dialer in the communication unit 4 or 27. Simultaneously, the default level data of English expertise in the user administration table 48 (level 2), as well as the dictionary serial of the dictionary to be used ("3" in the present case), are supplied to the buffer 47 for controlling the retrieval of the dictionaries. In the present case, therefore, the technical dictionary for computer science is used and the translation is made for the words having the level of 2–5. As a result, one obtains a translation as indicated in FIG. 20. Further, the content shown in FIG. 20 is transferred to the data converter 7 of the system of FIG. 1 for data conversion, and the data converter supplies the data thus converted to the network controller 5. Thereby, the network controller 5 forwards the transmission data to the data converter 3 for conversion ready for facsimile transmission, and the facsimile data thus produced is transmitted to the Koh-otsu Inc. under control of the communication unit 4.

(2) Transmission under operation of a registered member

It is also possible for a registered member of the Maru-batsu Corp., such as Jiro Suzuki, to operate the facsimile apparatus of the Maru-batsu Corp. to cause a forwarding of the facsimile transmission from the SCAN Inc. together with a translation thereof. In this case, Jiro Suzuki designates the "Koh-otsu Inc." in the destination field of facsimile transmission, and the facsimile number of the Koh-otsu Inc. of the user administration table 48 is transferred to the automatic dialer accordingly. Further, Jiro Suzuki sends the level 3 of English expertise of Jiro Suzuki for the case of facsimile transmission, to the retrieval control buffer 47, together with the dictionary serial 2. Thereby, the use of technical dictionary for electronics as well as the use of personal dictionary of Jiro Suzuki are indicated, and translation is achieved with a level between the level 3 and the level 5. The result of translation thus obtained is shown in FIG. 21. The text of FIG. 21 is then forwarded to the communication unit 4 after data conversion in the data converters 7 and 3 for transmission to the Koh-otsu Inc.

It should be noted that the transmission of documents with translation at the reception side or transmission side described above is not limited to the G3 facsimiles described above. For example, it is possible to process the documents given in the form of character codes similarly as before. In such a case of plain text, the step of OCR is skipped. Further, when processing texts embedded with control commands, the control commands are removed and the plain text thus obtained is subjected to translation.

Next, the automatic administration of destination, conducted at the calling side as well as the automatic user administration at the reception side, are described with reference to FIG. 22 showing a typical header of a facsimile document.

Referring to FIG. 22, the header includes the sender name at the right side of "From:" as well as the recipient name at the right side of "To:," and includes the field of "cc:" for the case where there are plural recipients. In the illustrated example, the sender is Tamami Davidson and the recipients are Yuka Yamada, Jiro Suzuki and Hanako Tanaka.

Figure 23:
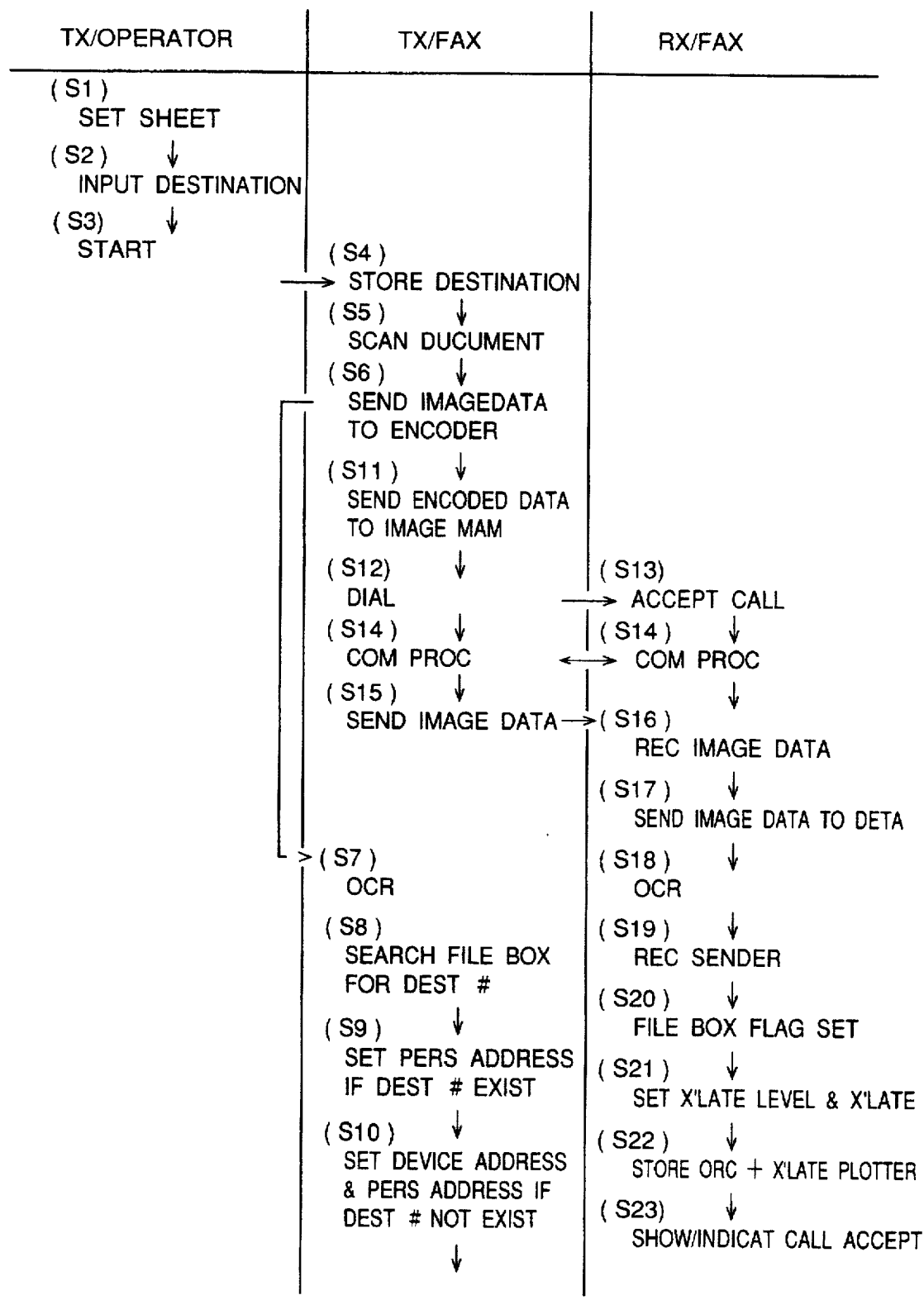
FIG. 23 is a diagram showing the procedures of facsimile transmission and reception achieved in the present invention.

FIG. 23 shows the flowchart for transmitting the document of FIG. 22 by way of facsimile. In FIG. 23, the left column shows the operation by the calling side operator, the central column shows the internal operation of the calling side facsimile apparatus, and the right column indicates the internal operation of the receiving side facsimile apparatus.

Referring to FIG. 23, the operator at the calling side sets a document on a scanner in a step S1 and describes the telephone number (+81-3-3210-1230) of the destination in a step S2, followed by actuating a start button in a step S3. In response to the step S3, the facsimile apparatus stores the designation telephone number in a temporary memory in a step S4 and starts feeding a sheet of the document to the scanner in a step S5. In response to the step S5, the document is read and converted to image data, and the image data thus obtained is transferred to the encoder 2 and further to an OCR unit in a step S6, wherein the OCR unit converts the image data in a step S3 with respect to the header part thereof to corresponding character codes. In the OCR step S7, it should be noted that the description "To:" is detected at first, followed by the recognition of the recipient that follows "To:." Further, "From:" is detected, followed by the recognition of the sender. Further, the description "cc:" is detected and the characters following the "cc:" are recognized.

After the recognition of the header part, the file box is created. There, a step S8 is conducted for searching through the telephone number field of the user administration table of FIG. 10 for the telephone number registered in the foregoing step S4. When there is no corresponding telephone number in the user administration table, the recipient name that follows "To:" is registered as the user name. Further, either of the first eight characters of the user name or the characters up to the first space of the user name are registered as a device address. When the registered telephone number exists in the user administration table, on the other hand as in the case of FIG. 10, this indicates that the device address and the user name are already registered in the user administration table. Thus, the personal file box of the recipient alone is set up by copying the registered device address as the device address and by copying the name(s) following "To:" and "cc:" similarly as before. The result of the registration as such is shown in FIG. 12.

After the foregoing, the content of the transmission is stored in one's file box. More specifically, the personal address of the file box for Ms. Yuka Yamada is set as /marubatsu/yuka, while the personal address of the file box for Mr. Jiro Suzuki is set as /marubatsu/jiro. Similarly, the personal address of the file box for Ms. Hanako Tanaka is set as /marubatsu/hanako.

Meanwhile, the content of the document transferred to the encoder 2 in the foregoing step S6 is compressed and stored in a memory in a step S11. Further, an automatic dialing is conducted in a step S12 while referring to the temporary memory mentioned previously, and an automatic dialing occurs according to the telephone number held in the temporary memory.

In response to the incoming call, the receiving apparatus returns an acknowledgement in a step S13, followed by exchange of protocol messages in steps S14 and S14', including the sending of the calling side telephone number. After the protocol procedure, a step S15 is conducted for transmitting the content of the image memory.

The image data thus transmitted is received by the reception side facsimile apparatus in a step S16, followed by a data decoding process in a step S17 conducted by the decoder 6. Thereby, the original image data indicative of the images read by the scanner is recovered. The image data is then forwarded to the OCR unit in a step S18 for conversion to characters. Thereby, the header part of the document is recognized first in a step S19 for extracting the contents that follow "From:," "To:" and "cc:." Based upon the information of the sender and recipient thus obtained, a step S20 is conducted for setting the file box addresses and the status flags. In the example of FIG. 12 for the recipient side, it is assumed that the setting of the file box is already achieved by newly adding Tamami Davidson.

After confirmation that the translation function is activated, the level of expertise is retrieved for each of the recipient-side users as well as the dictionaries to be used for translation, and the translation of the text in the transmitted document is achieved in a step S21. After the completion of the translation, the result of translation is supplied to the plotter 11 together with the transmitted document. Further, the document and the translation are held in the file box of the respective users in a step S22. For example, the documents for Yuka Yamada and Jiro Suzuki are held in the file box in the facsimile apparatus at respective addresses, /marubatsu/yuka and /marubatsu/jiro, while the document for Hanako Tanaka is forwarded to the personal computer or workstation 12 via the network controller 5.

Next, an embodiment for recording the original document on a first side of a sheet and for recording a translation thereof on a second, opposite side of the sheet will be described. This function is achieved by the image expansion unit 26.

Figure 24:
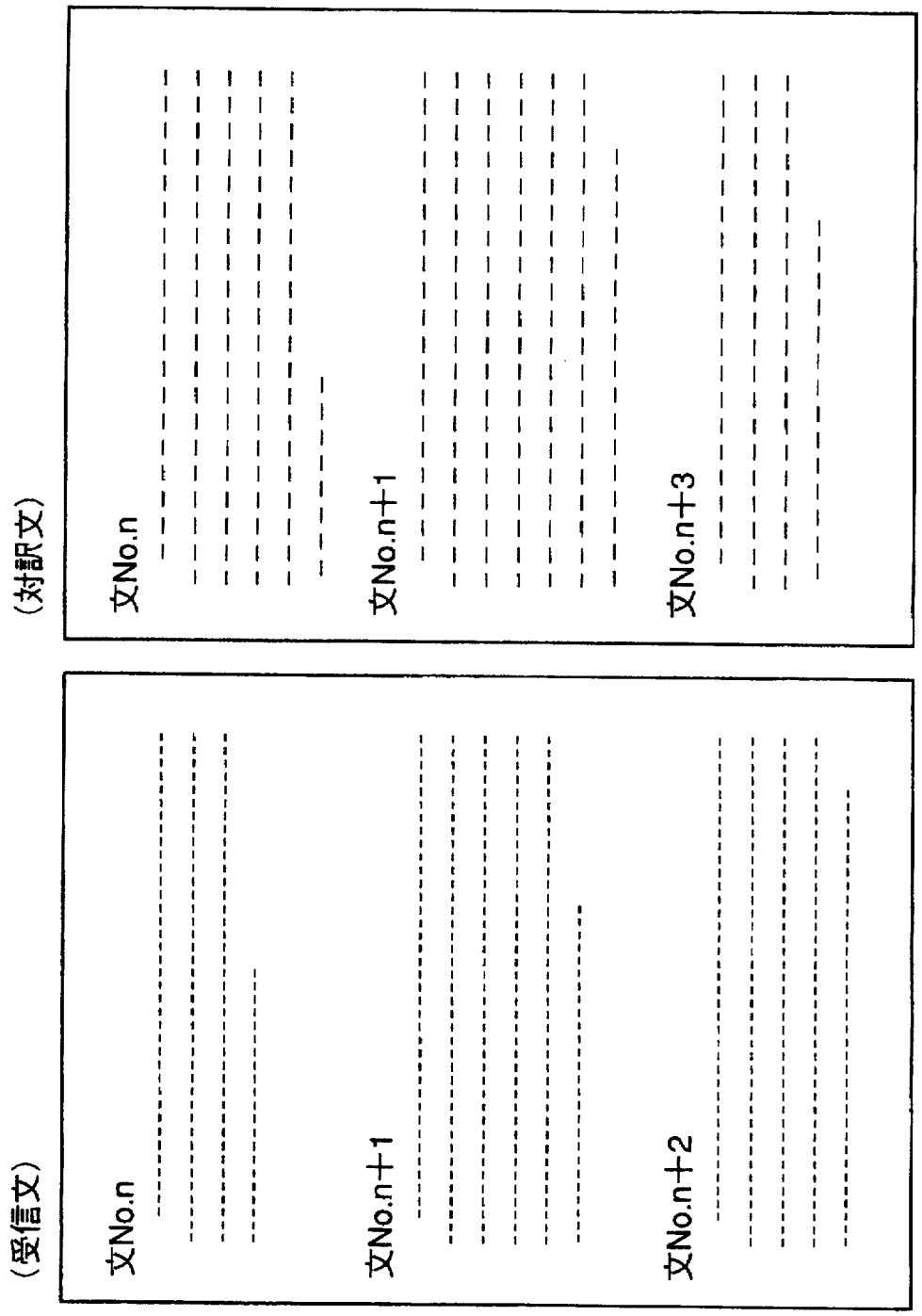
FIG. 24 is a diagram showing an example of output for presenting the original and translation in the present invention.

As already noted, each sentence in the received document is recognized for translation. Thereby, each sentence is given a sentence number, and the translation of the sentence is obtained sentence by sentence. Further, in order to maintain correspondence between the original and the translation in terms of layout of the document, the number of lines in the original and the number of lines in the translation are counted and compared. Thereby, blank lines are added to one of the original and the translation such that the original sentence and the translation of the sentence correspond with each other as shown in the example of FIG. 24. In FIG. 24, it should be noted that the original text at the left is represented on the first page and the translation at the right is represented on the second page.

In the example of FIG. 24, it should further be noted that those sentences that bridge across a page and a next page are detected by counting the number of lines and comparing the same with the position of page break. When such a bridging of the sentence across pages is detected, the entire sentence is moved to the new page by inserting blank lines at the end of the previous sentence. It should be noted such a correspondence between the original and the translation is maintained also in the case of outputting the translation in the form of word list.

Figure 25:
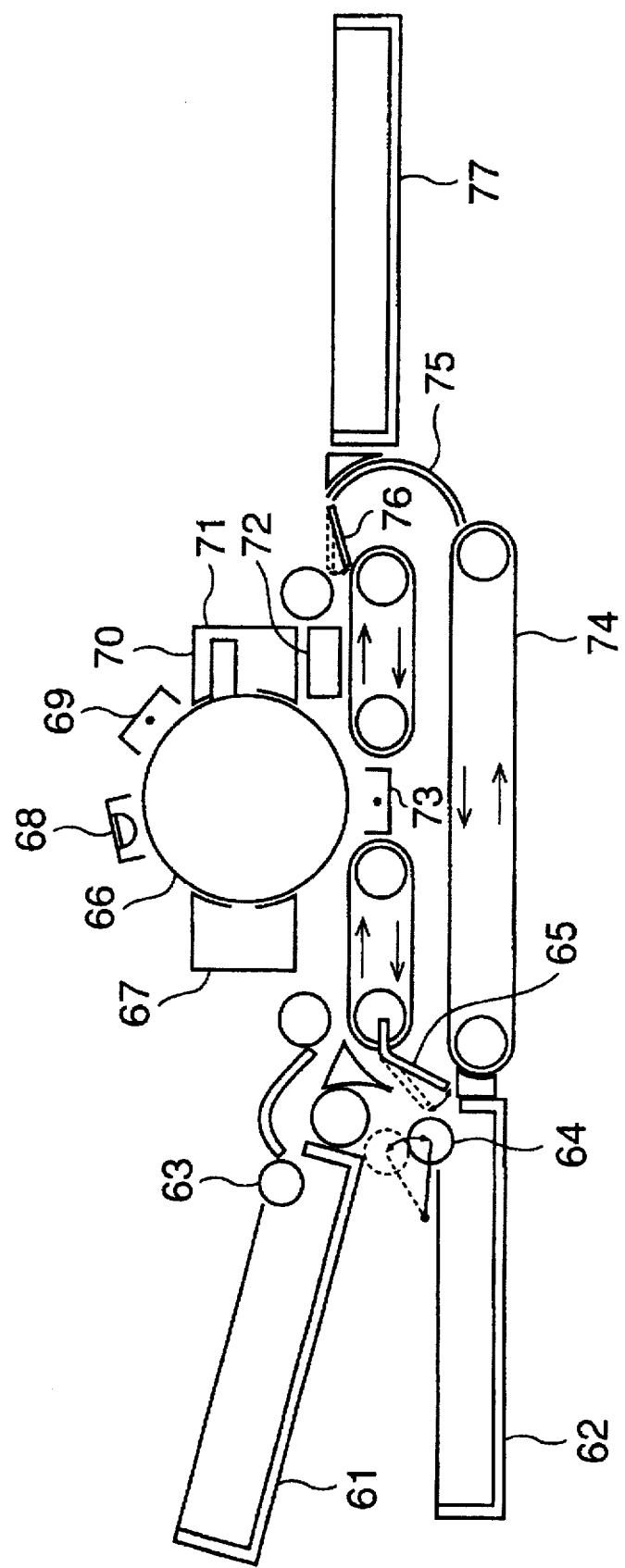
FIG. 25 is a diagram showing the construction of a plotter used in the facsimile apparatus of the present invention for recording on both sides of a sheet.

FIG. 25 shows the construction of the plotter 11 or 30 that is used for recording the original on the first page and the translation on the second page.

Referring to FIG. 25, it will be noted that the plotter 11 includes a sheet feed tray 61 for holding sheets, a temporary tray 62 for temporarily holding the sheets in the state that the sheets are recorded with an image on a first side thereof, a feed roller 63 for feeding the sheets in the tray 61 to an image recording station, and a feed roller 64 for feeding the sheets in the tray 62 to the foregoing image recording station. Further, there is provided a sheet path switcher 65 for switching the sheet feed path between a first path for recording images on the first side of the sheet and a second path for recording images on the second side. The image recording station has a conventional construction and includes a photosensitive drum 66 for carrying electrostatic latent images, a toner tank 67 for holding toners and forming a toner image on the photosensitive drum 66 in correspondence to the electrostatic latent image thereon, an LED array for recording images on the photosensitive drum 66 to form the foregoing electrostatic latent image, a precharger 69 for precharging the photosensitive drum 66, a cleaning blade 70 for removing toners from the photosensitive drum 66 after the image recording, a toner recovery tank 71 for recovering the toners removed from the photosensitive drum 66 by the cleaning blade, a fixing unit 72 for fixing the toner image on the recording sheet, and a transfer charger 73 for transferring the toner image on the photosensitive drum 66 upon the recording sheet.

Further, there is provided a sheet feed system 74 for carrying sheets recorded with an image on the first side thereof and a feet feed path switch 76 for switching the sheet feed path of the sheet recorded with an image at the image transfer charger 73 of the image recording station, between a first path for ejecting the sheet and a second path for feeding the sheet to the tray 62 after turning over the side of the sheet at a sheet guide 75. The sheets recorded with images on both sides are ejected to a recovery tray 77.

After the translation of the received document, the received document as well as the translation of the original text are supplied to the plotter of FIG. 25. In the state of FIG. 25, it should be noted that the plotter is set to record an image on a rear side of the sheet. By activating the plotter in the bilateral mode for recording images on both sides of a sheet, the sheet on the tray 61 is fed to the recording station for recording of an image on the first side of the sheet. The sheet thus recorded with an image on the first side is then forwarded to the temporary tray 62 after inversion of the side at the guide 75. Thereby, the sheets each carrying an image on the first side, are accumulated on the temporary tray 62. Next, the sheets on the temporary tray 62 are supplied to the image recording station for recording images on the second side of the sheet. After the recording, the sheets thus carrying images on the both sides are ejected to the recovery tray 77.

Meanwhile, there are users whose expertise of foreign language is very high. For such users, the detailed translation provided by the communication apparatus may be not welcomed even though it is possible to set the level of translation. These skilled users may rather want to have translation of only those specific words marked on the document after reviewing the received document.

The facsimile apparatus of the present invention is also capable of dealing with such a case. In such a case, the user of the reception side sets the facsimile apparatus to a mode for outputting the received documents directly to the plotter. Simultaneously, the OCR is activated. In such a mode, the received image data is outputted from the plotter after image decompression in the decoder such as the decoder 6 of FIG. 1 or encoder/decoder 28 of FIG. 2 and is simultaneously subjected to a character recognition process by the OCR unit 8 of FIG. 1 or 24 of FIG. 2. Thereby, administration information for each page, each line and each word is created and stored in the file box of the user directly without passing through the translation unit. In other words, the file box of the user stores the character codes of the original text together with the administration information of the received document indicative of the pages, lines in a page and the words in a line.

Thus, the user reads the document outputted from the plotter and marks the words of which translation is desired. Typically, the user marks the specific words by black ink as indicated in FIG. 26, and sets the document thus marked upon the image reader of the facsimile apparatus again.

FIG. 27 shows the operation of the user and the facsimile apparatus for such a case.

Referring to FIG. 27, the user sets the marked document on a image scanner in a step S1 and activates a selective translation mode in a step S2 for carrying out translation of the marked words selectively. Further, the file box for the user is specified in a step S3, and the range of the pages in the document that is subjected to the process is specified in a step S4. By pressing the start button in a step S5, the operation of the selective translation mode starts.

Thus, the facsimile apparatus reads the setting on a control panel indicative of the result of setting, and the content of the page or pages that is subjected to selective translation is transferred in a step S6 from the user file box to a temporary file. Next, the document set to the scanner is read in a step S7, and the image data of the document thus created is then supplied directly to the OCR unit in a step S8 for conversion to character codes. Thereby, character codes are stored in a temporary file B together with information with respect to the location of the marked word. Further, a comparison is made in a step S9 between the temporary file A and the temporary file B for identifying the content of the marked word in the temporary file B. The marked word is then transferred to the translation unit, and the translation unit provides a translation of the given word in a step S10 with reference to the dictionaries. The result of translation is then transferred to the plotter and simultaneously stored in the file box of the user in a step S11 together with the content of the temporary file B, with a tag attached to the translation indicative of the correspondence between the file B and the translation. Finally, an audible notification is made in a step S12 to the user indicative of completion of the operation.

FIG. 28 shows the result of the output thus obtained in the step S11 of FIG. 27. In FIG. 28, [P3.] indicates that the translation is for the content of page 3, and W1, W2 and W3 indicate the sequential number of the marked words.

It should be noted that the feature of translating the marked words by reading the marked document is not limited to the facsimile apparatus or other communication apparatuses but also applicable to any of the translation apparatus that has a capability of reading a document and recognizing the characters for translation.

Further, it should be noted that the present invention is by no means limited to the translation between English and Japanese but is also applicable to other combination of languages as in the case of translating between English and German, German and French, English and French, and the like. Further, it is possible to provide capability of translating more than two sources languages to the translation unit with respective OCR functions adapted to the source languages. By providing the capability for dealing with plural source languages, it is possible to identify the source language based upon given transmission and activate the translating unit according to the source language thus identified.

In the case of the calling side apparatus describes the source language in the protocol messages as in the case of FIGS. 3–8, it is possible to discriminate the source language and activate the translation unit according to the indicated source language.

It is also possible to estimate the source language based upon the country code of the calling terminal transmitted with the TSI command of the G3 facsimile protocol or the CSS command of the G4 facsimile protocol. On the other hand, such an estimation may be inappropriate when the transmitted document is written in the language other than the language of the source country from which the call is made. For example, the transmission from France may be written in English. Thus, the reception side apparatus first checks for the country code for identifying the source country and then first several sentences are subjected to examination for language, by referring to dictionaries of several languages. In the case of receiving a call from France, one detects the country code 33. Thereby, the translation unit translates several sentences in the first page with reference to French-Japanese dictionary and further with reference to English-Japanese dictionary. Thereby, the probability of hitting the word is evaluated for the both dictionaries and the one that has provided the highest rate of hitting is used for translation. Herein, the rate of hitting may be defined as the number of words that have been found in the dictionary divided by the total number of words that have been searched for.

Further, there is an possibility that the source language is different from any of French and English, as in the case of the transmission is made in German. In order to deal with such a case, the translation unit may change the candidate language when the rate of hit is less than a predetermined threshold such as 80%.

Alternatively, it is possible to identify the language based upon the individual sender of the calling terminal. In this case, the user administration table of FIG. 11–12 are expanded such that the language that the sender uses is added to the user administration table. Thereby, the translation is activated with reference to the user administration table for the source language.

Figure 29:
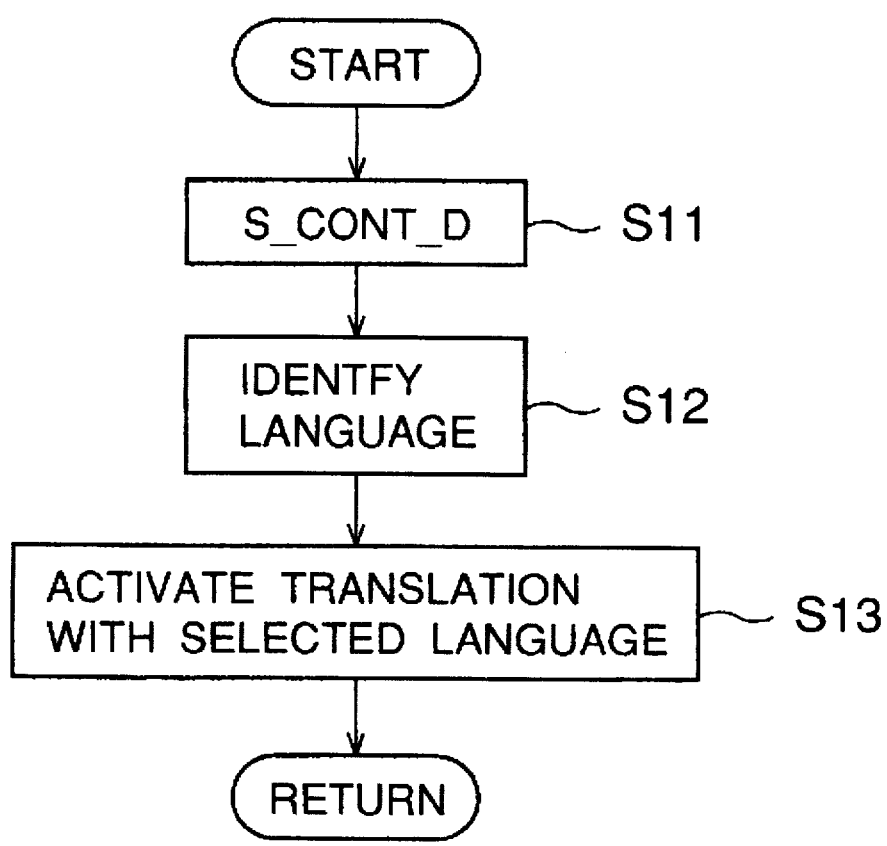
FIG. 29 is a flowchart for discriminating the source language of the facsimile transmission based upon a non-standard protocol message.

FIG. 29 shows the process conducted by the translation unit 9 or 25 for translating the received document based upon the identification of the source language by the non-standard protocol message described before.

Referring to FIG. 29, it will be noted that the S_CONT_D message is extracted in a step S11 and the identification of the source language is made in a step S12 based upon the S_CONT_D message thus obtained. Further, the translation unit 9 or 25 is activated according to the source language thus identified.

Figure 30:
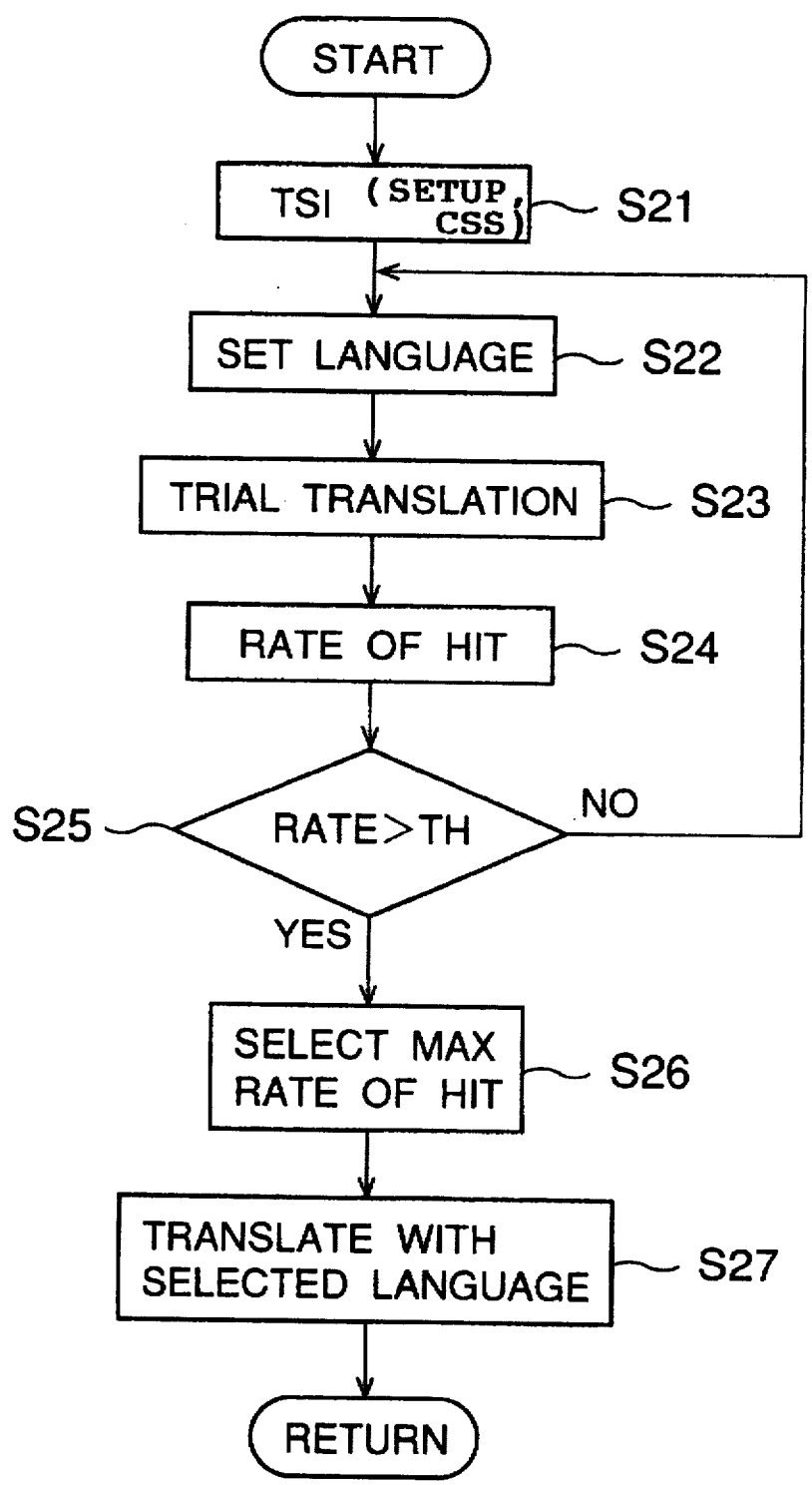
FIG. 30 is a flowchart for identifying the source language by comparing the result of translations.

FIG. 30 shows the process conducted by the translation unit 9 or 25 for identifying the source language based upon the trial translation.

Referring to the FIG. 30, the TSI, SETUP or CSS command is extracted in a step S21 and a candidate language is set in a step S22 based upon the source country designated by the TSI or CSS message. Further, a trial translation is made in a step S23 for the first part of the document with reference to a dictionary for the first candidate language, and a rate of hitting the word is evaluated in a step S24. Further, an examination is made in a step S25 whether or not the evaluated rate of hit exceeds a predetermined threshold TH, and the step S22 is carried out again with a different language when the result of discrimination in the step is NO. Further, a step S26 is conducted for selecting the language that has provided the maximum rate of hit, and the translation of the document is activated in a step S27 with the language thus identified.

Figure 31:
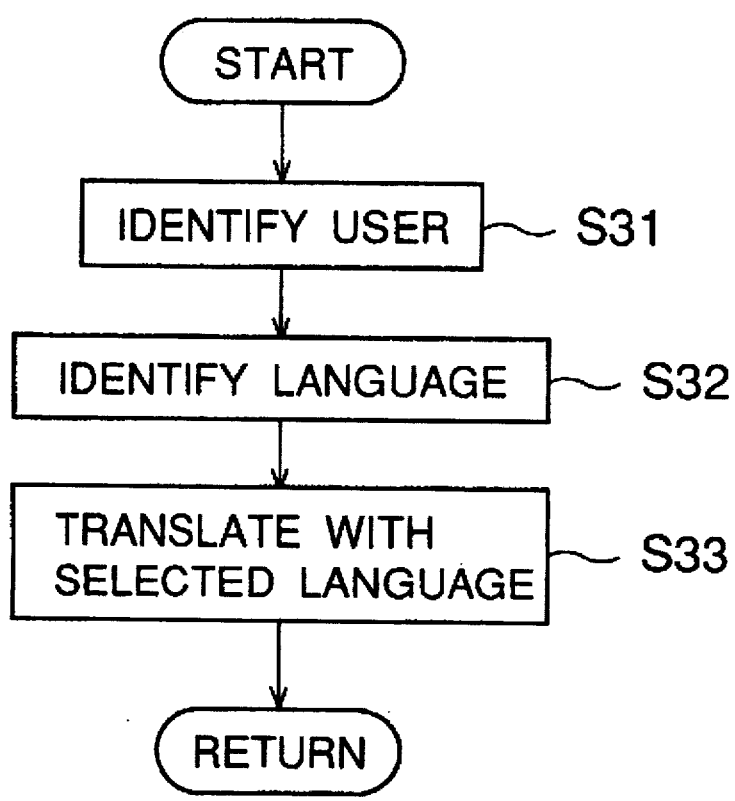
FIG. 31 is a flowchart for identifying the source language based upon the user information.

FIG. 31 shows a case for identifying the source language based upon the sender at the calling facsimile apparatus.

In the process of FIG. 31, the sender is identified in a step S31 based upon the personal address of the incoming facsimile transmission and the language is determined in a step S32 with reference to the user administration table. Further, the translation unit S33 is activated in accordance with the source language determined in the step S33.

Further, the present invention is not limited to the embodiments described heretofore, but various variations and modifications may be made without departing from the scope of the invention.

What is claimed is:

1. A telecommunication apparatus, comprising:
   communication means for communicating with a remote terminal according to a communication protocol;
   storage means for storing information received by said communication means, said information corresponding to a document and including at least one of image data and text data, said image data and text data forming said document written in a source language; and
   translation means for translating said document from said source language to a target language,
   wherein said communication protocol includes a facsimile protocol;
   said telecommunication apparatus further includes character recognition means for converting image data included in said information to corresponding text data, said character recognition means thereby distinguishing said image data from said text data in said information based upon said communication protocol;
   said translation means has a capability of carrying out a translation in one or more language systems, each of said language systems including a source language and a target language; and
   wherein said translation means includes: language identification means for identifying the source language from a command used in said communication protocol for notifying, to said telecommunication apparatus, of a terminal identification number identifying a terminal that is sending said information to said telecommunication apparatus, said translation means selectively activating a translation according to a language system that includes said source language thus identified by said language identification means.

2. A telecommunication apparatus as claimed in claim 1, wherein said translation means identifies said source language based upon a TSI command of a G3 facsimile protocol, said TSI command including said terminal identification number.

3. A telecommunication apparatus as claimed in claim 1, wherein said translation means identifies said source language based upon a description in a SETUP command of a G4 facsimile protocol, said SETUP command including said terminal identification number.

4. A telecommunication apparatus as claimed in claim 1, wherein said translation means identifies said source language based upon a description in a CSS command of a G4 facsimile protocol, said description including said terminal identification number.

5. A telecommunication apparatus as claimed in claim 1, wherein said telecommunication apparatus notifies to said remote terminal about a non-standard procedure that is supported by said communication protocol at a side of said telecommunication apparatus, said nonstandard procedure at said telecommunication apparatus including a description of a language system that is used in said telecommunication apparatus for creating a document, and wherein said telecommunication apparatus is notified from said remote terminal about a non-standard procedure that is supported by said communication protocol at a die of said remote terminal, said non-standard procedure at said remote terminal including a description of a language that is used in said remote terminal for creating a document, said communication protocol being used commonly between said telecommunication apparatus and said remote terminal.

6. A telecommunication apparatus as claimed in claim 1, wherein said telecommunication apparatus and said remote terminal that communicates with said telecommunication apparatus commonly support a G3 facsimile protocol,
   wherein said telecommunication apparatus notifies to said remote terminal about a non-standard procedure that is supported by said G3 facsimile protocol at a side of said telecommunication apparatus, said non-standard procedure at said telecommunication apparatus including a description of a language that is used in said telecommunication apparatus for creating a document, and wherein said telecommunication apparatus is notified from said remote terminal about said non-standard procedure that is supported by said G3 facsimile protocol at a side of said remote terminal, and nonstandard procedure at said remote terminal including a description of a language that is used in said remote terminal for creating a document.

7. A telecommunication apparatus as claimed in claim 1, wherein said telecommunication apparatus and said remote terminal that communicates with said telecommunication apparatus commonly support a G4 facsimile protocol, wherein said telecommunication apparatus notifies to said remote terminal about a non-standard procedure that is supported by said G4 facsimile protocol at a side of said telecommunication apparatus, said non-standard procedure at said telecommunication apparatus including a description of a language that is used in said telecommunication apparatus for creating a document, and wherein said telecommunication apparatus is notified from said remote terminal about a non-standard procedure that is supported by said G3 facsimile protocol at a side of said remote terminal, said non-standard procedure at said remote terminal including a description of a language that is used in said remote terminal for creating a document.

8. A telecommunication apparatus as claimed in claim 5, wherein said telecommunication apparatus further includes character recognition means for recognizing characters from image data, wherein said telecommunication apparatus further includes discrimination means for discriminating, based upon said communication protocol, whether or not said information from said remote terminal, received by said communication means, is given in the form of image data or not, and wherein said telecommunication apparatus activates said character recognition means when said information is given in the form of image data.

9. A telecommunication apparatus as claimed in claim 8, wherein said telecommunication apparatus further includes discrimination means for discriminating whether or not said information from said remote terminal received by said communication means is given in the form of plain text data based upon said communication protocol, said telecommunication apparatus further including extraction means for extracting a plain text when said information is given in the form other than said plain text data.

10. A telecommunication apparatus as claimed in claim 1, wherein said telecommunication apparatus further includes recipient recognition means for recognizing a recipient of a transmission directed to said telecommunication apparatus, user administration means for administrating users of said telecommunication apparatus, dictionary administration means for administrating dictionaries used by said translation means, and translation condition setting means for setting a condition of translation carried out by said translation means.

11. A telecommunication apparatus as claimed in claim 1, wherein said telecommunication apparatus further includes sender recognition means for recognizing a sender of a transmission directed to said telecommunication apparatus, user administration means for administrating users of said telecommunication apparatus, dictionary administration means for administrating dictionaries used by said translation means, and translation condition setting means for setting a condition of translation carried out by said translation means.

12. A telecommunication apparatus as claimed in claim 1, wherein said telecommunication apparatus further includes sender recognition means for recognizing a sender of a transmission directed to said telecommunication apparatus and dictionary administration means for administrating dictionaries used by said translation means.

13. A telecommunication apparatus as claimed in claim 1, wherein said telecommunication apparatus includes a dictionary that includes a content common to a dictionary of a transmission side telecommunication apparatus.

14. A telecommunication apparatus as claimed in claim 1, wherein said telecommunication apparatus includes administration means for administrating users of said telecommunication apparatus and file boxes assigned to each of said users.

15. A telecommunication apparatus as claimed in claim 1, wherein said telecommunication apparatus further includes first output means as a part of said translation means for outputting said information received by said communication means and corresponding to said document with said source language, second output means as a part of said translation means for outputting said information received by said communication means and corresponding to said document with said target language, and selection means for activating one or both of said first and second output means.

16. A telecommunication apparatus as claimed in claim 15, wherein said first and second output means output said information received by said communication means and corresponding to said document such that said information output from said first output means and said information output from said second output means are recorded on a common recording medium in a corresponding relationship, respectively in said source language and said target language.

17. A telecommunication apparatus as claimed in claim 15, wherein said first and second output means output said information such that an output of said first output means is recorded on a first side of a sheet with said source language and an output of said second output means is recorded on a second, opposite side of said sheet with said target language.

18. A telecommunication apparatus as claimed in claim 1, wherein said telecommunication apparatus includes first output means for outputting said document on a sheet with said source language based upon said information received from said remote terminal by said communication means, comparison means for reading said document recorded on said sheet and for comparing said document with information in said storage means, and extraction means for extracting a part of said document that disagrees with said information held in said storage means, wherein said translation means translates only said extracted part of said document.

19. A telecommunication system comprising:
a network for carrying a traffic of communication;
a first telecommunication apparatus connected to said network for communication;
a second telecommunication apparatus connected to said network for communication;
each of said first and second telecommunication apparatuses comprising: communication means for communicating with a remote terminal according to a communication protocol; storage means for storing information received by said communication means, said information corresponding to a document and including at least one of image data and text data, said image data and text data forming said document written in a source language; and translation means for translating said document from said source language to a target language, said translation means including a dictionary describing a correspondence between said source language and said target language, wherein said communication protocol includes a facsimile protocol; said telecommunication apparatus further includes character recognition means for converting image data included in said information to corresponding text data, said character recognition mean thereby distinguishing said image data from said text data in said information based upon said communication protocol; said translation means has a capability of carrying out a translation in one or more language systems, each of said language systems including a source language and a target language; and wherein said translation means includes: language identification means for identifying the source language from a command used in said communication protocol for notifying, to said telecommunication apparatus, of a terminal identification number identifying a terminal that is sending said information to said telecommunication apparatus, said translation means selectively activating a translation according to a language system that includes said source language thus identified by said language identification means;

wherein said dictionary of said first telecommunication apparatus and said dictionary of said second telecommunication apparatus contain the same content.

20. A translation apparatus for translating a given document written with a source language to a target language, comprising:

outputting means for recording said document on a sheet with said source language;

storing means for storing said document in said source language;

reading means for reading a document on a sheet, said reading means reading said document recorded on said sheet with said source language;

comparison means for comparing the document read by said reading means with said document stored in said storing means, for detecting a discrepancy between said document read by said reading means and said document stored in said storing means;

extraction means for extracting a part of said given document wherein a discrepancy is detected by said comparison means; and translation means for translating said part of said document.

21. A telecommunication apparatus, comprising:

communication means for communicating with a remote terminal according to a communication protocol;

storage means for storing information to be transmitted by said communication means, said information corresponding to a document and including at least one of image data and text data, said image data and text data forming said document written in a source language;

translation means for translating said document from said source language to a target language, wherein said communication protocol includes a facsimile protocol;

said telecommunication apparatus further includes character recognition means for converting image data included in said information to corresponding text data, said character recognition means thereby distinguishing said image data from said text data in said information based upon said communication protocol;

said translation means has a capability of carrying out a translation in one or more language systems, each of said language systems including a source language and a target language; and wherein said translation means includes: language identification means for identifying the source language from a command used in said communication protocol for notifying, to said telecommunication apparatus, of a terminal identification number identifying a remote terminal to which said information is to be sent from said telecommunication apparatus, said translation means selectively activating a translation according to a language system that includes said source language thus identified by said language identification means;

said communication means thereby transmitting said information to said remote terminal with a translation of said document in said target language.

* * * * *